United States Patent
Arakawa et al.

(10) Patent No.: US 10,086,721 B2
(45) Date of Patent: Oct. 2, 2018

(54) VEHICLE SEAT

(71) Applicants: TOYOTA BOSHOKU KABUSHIKI KAISHA, Aichi-ken (JP); SHIROKI CORPORATION, Kanagawa (JP)

(72) Inventors: Yuji Arakawa, Toyota (JP); Naoki Hayashi, Toyokawa (JP)

(73) Assignees: TOYOTA BOSHOKU KABUSHIKI KAISHA, Aichi (JP); SHIROKI CORPORATION, Kanagawa (JP)

( * ) Notice: Subject to any disclaimer, the term of this patent is extended or adjusted under 35 U.S.C. 154(b) by 212 days.

(21) Appl. No.: 14/694,209

(22) Filed: Apr. 23, 2015

(65) Prior Publication Data

US 2015/0306981 A1 Oct. 29, 2015

(30) Foreign Application Priority Data

Apr. 25, 2014 (JP) .................................. 2014-091077

(51) Int. Cl.
*B60N 2/07* (2006.01)
*B60N 2/08* (2006.01)

(52) U.S. Cl.
CPC .......... *B60N 2/0862* (2013.01); *B60N 2/0705* (2013.01); *B60N 2/0715* (2013.01);
(Continued)

(58) Field of Classification Search
CPC .. B60N 2/0818; B60N 2/0705; B60N 2/0715; B60N 2/0722; B60N 2/08; B60N 2/0812;
(Continued)

(56) References Cited

U.S. PATENT DOCUMENTS

| | | | | |
|---|---|---|---|---|
| 5,842,383 A | * | 12/1998 | Yamada | B60N 2/071 248/429 |
| 6,264,159 B1 | * | 7/2001 | Su | B60N 2/0705 248/430 |

(Continued)

FOREIGN PATENT DOCUMENTS

| | | | | |
|---|---|---|---|---|
| DE | 10347490 A1 | * | 5/2004 | B60N 2/0705 |
| DE | 102013210329 A1 | * | 12/2013 | B60N 2/0818 |

(Continued)

OTHER PUBLICATIONS

The Free Dictionary, Definition of Surround, Retrieved Apr. 15, 2018, https://www.thefreedictionary.com/surround. (Year: 2018).*

(Continued)

*Primary Examiner* — Jonathan Liu
*Assistant Examiner* — Guang H Guan
(74) *Attorney, Agent, or Firm* — Greenblum & Bernstein, P.L.C.

(57) ABSTRACT

A vehicle seat includes a slide rail, including a lower rail and an upper rail, and includes a slide lock mechanism. The slide lock mechanism includes a lock member and an operating member. The lock member includes a first urging member. The operating member includes a second urging member. A clearance is set in a region from an initial position to an operation position of the operating member. The operating member includes an input operating member and an output operating member. The clearance is provided between the input operating member and the output operating member. The initial position is set by maintaining the clearance between the input operating member and the output operating member using an urging force of the second urging member. The second urging member includes a first support portion, a second support portion, and a first engagement portion.

5 Claims, 21 Drawing Sheets

(52) U.S. Cl.
CPC ........... *B60N 2/0722* (2013.01); *B60N 2/085* (2013.01); *B60N 2/0818* (2013.01)

(58) Field of Classification Search
CPC .... B60N 2/0831; B60N 2/0837; B60N 2/085; B60N 2/0862; B60N 2/0875; B60N 2/0881; B60N 2/0887
USPC .......................... 248/419, 420, 424, 429, 430; 296/65.13–65.15; 297/344.1, 344.11
See application file for complete search history.

(56) References Cited

U.S. PATENT DOCUMENTS

| | | | | |
|---|---|---|---|---|
| 6,305,746 | B1 * | 10/2001 | Ikegaya | B60N 2/071 248/429 |
| 7,717,392 | B2 * | 5/2010 | Sakakibara | B60N 2/0705 248/424 |
| 8,616,515 | B2 * | 12/2013 | Hayashi | B60N 2/0705 248/424 |
| 8,936,227 | B2 * | 1/2015 | Kawamura | B60N 2/08 248/429 |
| 9,145,070 | B2 * | 9/2015 | Hayashi | B60N 2/0705 |
| 9,371,013 | B2 * | 6/2016 | Nakamura | B60N 2/0705 |
| 9,463,716 | B2 * | 10/2016 | Hayashi | B60N 2/08 |
| 9,827,877 | B2 * | 11/2017 | Jahner | B60N 2/06 |
| 2012/0132778 | A1 * | 5/2012 | Nakamura | B60N 2/0705 248/429 |
| 2014/0042289 | A1 * | 2/2014 | Kawano | B60N 2/0818 248/429 |
| 2014/0110552 | A1 * | 4/2014 | Yamada | B60N 2/0705 248/429 |

FOREIGN PATENT DOCUMENTS

| | | | | |
|---|---|---|---|---|
| EP | 0751029 | A2 * | 1/1997 | ............. B60N 2/071 |
| EP | 2738037 | B1 * | 3/2016 | ........... B60N 2/0705 |
| JP | 2005-238929 | | 9/2005 | |
| JP | WO 2010001956 | A1 * | 1/2010 | ........... B60N 2/0707 |
| JP | WO 2011136048 | A1 * | 11/2011 | ........... B60N 2/0705 |
| JP | WO 2012081354 | A1 * | 6/2012 | ........... B60N 2/0705 |
| JP | WO 2013035414 | A1 * | 3/2013 | ........... B60N 2/0705 |
| WO | 2010/080597 | | 7/2010 | |
| WO | 2014/054513 | | 4/2014 | |

OTHER PUBLICATIONS

German Official Action for DE 10 2015 207 472.2, dated Feb. 11, 2016, along with English-language translation thereof.

* cited by examiner

FIG. 5
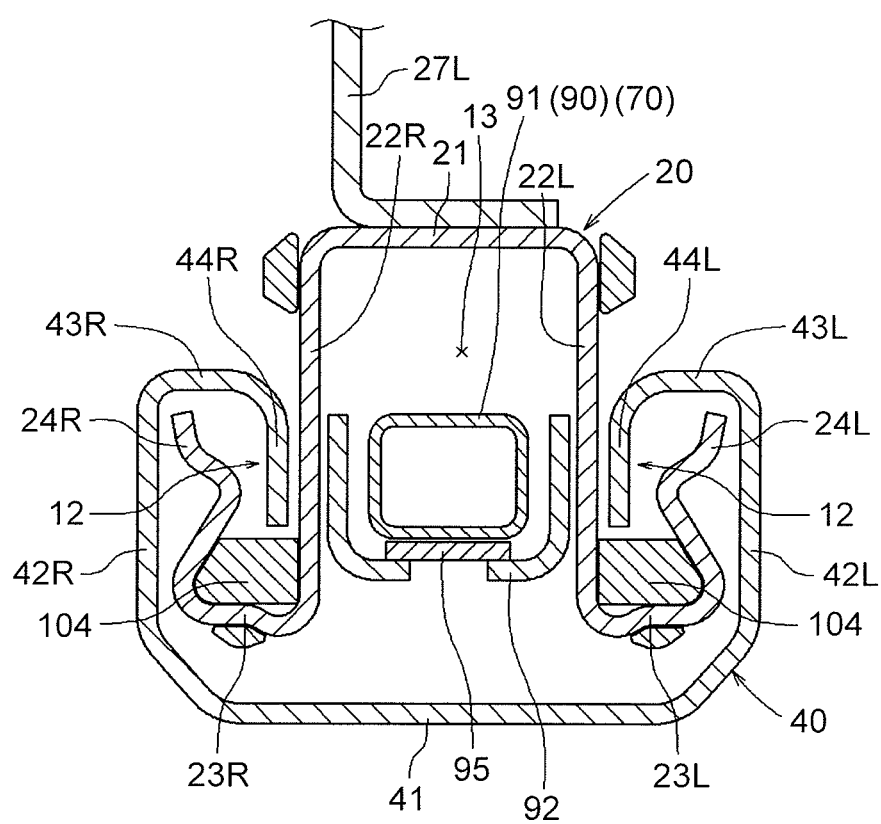
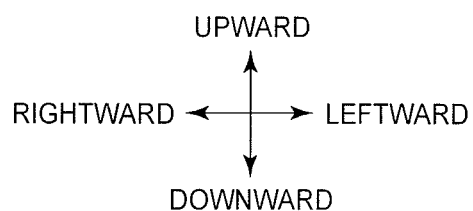

VEHICLE SEAT

INCORPORATION BY REFERENCE

The disclosure of Japanese Patent Application No. 2014-091077 filed on Apr. 25, 2014 including the specification, drawings and abstract is incorporated herein by reference in its entirety.

BACKGROUND OF THE INVENTION

1. Field of the Invention

The invention relates to a vehicle seat.

2. Description of Related Art

For example, Japanese Patent Application Publication No. 2005-238929 (JP2005-238929A) describes a vehicle seat that includes a slide rail including a lower rail disposed on the side of a vehicle structure member such as a floor surface of a vehicle, and an upper rail disposed on the side of a seat body and supported to be slidable relative to the lower rail; and a slide lock mechanism that restrains slide movement of the upper rail with respect to the lower rail at a selected position. In JP2005-238929A, the slide movement of the upper rail is locked using a lock member, and the locking achieved by the lock member is unlocked (the lock state achieved by the lock member is canceled) by operating an operating member.

However, in the vehicle seat in JP2005-238929A, further improvement is required to address a concern that an unintended force in such a direction as to cancel the slide lock state may be applied due to an unexpected external load such as a large load, and a concern that the slide lock state may be canceled due to relative torsion (twisting) of the rails in the slide rail.

SUMMARY OF THE INVENTION

The invention provides a vehicle seat in which unintended canceling of a slide lock state is suppressed even when an unexpected external load, such as a large load, is applied to a slide lock mechanism and a slide rail.

A first aspect of the invention relates to a vehicle seat including a slide rail that includes a lower rail disposed on a side of a vehicle structure member, and an upper rail disposed on a side of a seat body and supported to be slidable with respect to the lower rail; and a slide lock mechanism that restrains slide movement of the upper rail with respect to the lower rail at a selected position. The slide lock mechanism includes a lock member that restrains the slide movement of the upper rail at the selected position to achieve a slide lock state, and an operating member that transmits, to the lock member, a canceling operating force for canceling the slide lock state achieved by the lock member. The lock member includes a first urging member that elastically applies an urging force to maintain the slide lock state achieved by the lock member. The operating member includes a second urging member that applies an urging force toward an initial position at which the operating member is located before an operation of the operating member is started. The urging force of the first urging member is set to be larger than the urging force of the second urging member. The operating member is moved from the initial position to an operation position such that the canceling operating force is applied against the urging force of the first urging member and the urging force of the second urging member. When the operating member is located at the operation position, the slide lock state achieved by the lock member is canceled. A clearance is set in a region from the initial position to the operation position. The operating member includes an input operating member to which the canceling operating force is input, and an output operating member that outputs the canceling operating force. The second urging member is provided between the input operating member and the output operating member such that the input operating member and the output operating member are connected to be movable relative to each other. The clearance is provided between the input operating member and the output operating member. The initial position is set by maintaining the clearance between the input operating member and the output operating member using the urging force of the second urging member. The second urging member includes a first support portion that applies an urging force to the input operating member to support the input operating member, a second support portion that applies an urging force to the output operating member to support the output operating member, and a first engagement portion that is engaged with the upper rail.

According to the above-mentioned aspect, the operating member is moved from the initial position to the operation position such that the canceling operating force is applied against the urging force of the first member and the urging force of the second urging member. When the operating member is located at the operation position, the slide lock state achieved by the lock member is canceled. The clearance is set in the region from the initial position to the operation position. Thus, it is possible to suppress unintended canceling of the slide lock state even when an unexpected external load, such as a large load, is applied to the slide lock mechanism and the slide rail. Further, the operating member includes the second urging member that applies the urging force toward the initial position at which the operating member is located before the operation of the operating member is started. Thus, the operating member can be maintained at the initial position until the canceling operating force is applied (input) to the operating member.

The operating member includes the three members, in other words, the input operating member to which the canceling operating force is input, the output operating member that outputs the canceling operating force, and the second urging member. The clearance is provided between the input operating member and the output operating member. The initial position is set by maintaining the clearance between the input operating member and the output operating member using the urging force of the second urging member. Thus, it is possible to provide the slide lock mechanism that suppresses the unintended canceling of the slide lock state more reliably.

In the above-mentioned configuration, the second urging member includes the first support portion that applies the urging force to the input operating member to support the input operating member, the second support portion that applies the urging force to the output operating member to support the output operating member, and the first engagement portion that is engaged with the upper rail. Thus, the second urging member can stably (reliably) maintain the input operating member and the output operating member in the connected state, when the input operating member and the output operating member are moved relative to each other.

In the vehicle seat according to the above-mentioned aspect, the first engagement portion may be engaged with the upper rail such that the first engagement portion is rotatable relative to the upper rail.

In the above-mentioned configuration, the first engagement portion is rotatable relative to the upper rail, and thus, the second urging member is rotatable relative to the upper rail. Thus, it is possible to reduce the influence of the urging force of the second urging member on the operating member. Accordingly, an operator feels that the operating member is continuously (smoothly) operated, without unnecessarily increasing the canceling operating force.

In the vehicle seat according to the above-mentioned aspect, the urging force of the first support portion and the urging force of the second support portion may be applied, in the region from the initial position of the operating member to the operation position of the operating member; and the first engagement portion may be maintained in an engaged state, in the region from the initial position of the operating member to the operation position of the operating member.

In the above-mentioned configuration, it is possible to stably (reliably) maintain the input operating member and the output operating member in the connected state when the input operating member and the output operating member are moved relative to each other, and at the same time, it is possible to reduce the influence of the urging force of the second urging member on the operating member such that the operator feels that the operating member is continuously (smoothly) operated, without unnecessarily increasing the canceling operating force.

In the vehicle seat according to the above-mentioned aspect, the urging force of the first support portion may be applied in a direction facing a direction in which the urging force of the second support portion is applied.

In the above-mentioned configuration, it is possible to further reduce or suppress the backlash of the input operating member and the output operating member in the operating member.

In the vehicle seat according to the above-mentioned aspect, the lock member may be disposed in a space portion surrounded by a lower face portion of the lower rail, an upper face portion of the upper rail, and paired side face portions of one of the lower rail and the upper rail, the lower face portion facing the vehicle structure member, and the upper face portion facing the seat body; and the operating member may be inserted through end portions of the lower rail and the upper rail in a longitudinal direction, and is engaged with the lock member.

In the above-mentioned configuration, the lock member is disposed in the space portion of the slide rail. Thus, it is possible to provide the compact-sized slide lock mechanism. Accordingly, a space around the seat body can be effectively used. Further, with the compact-sized slide lock mechanism, it is possible to suppress the unintended canceling of the slide lock state.

According to the above-mentioned aspect of the invention, it is possible to provide the vehicle seat in which the unintended canceling of the slide lock state is suppressed even when an unexpected external load, such as a large load, is applied to the slide lock mechanism and the slide rail.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a sectional view taken along a line V-V in FIG. 4;

DETAILED DESCRIPTION OF EMBODIMENTS

Hereinafter, a vehicle seat according to a first embodiment of the invention will be described with reference to FIG. 1 to FIG. 18. In the first embodiment, a vehicle front seat will be described as an example of the vehicle seat. In each drawing, directions, which are appropriately indicated by arrows, respectively coincide with forward, rearward, upward, downward, rightward, and leftward directions when seen from an occupant seated on the vehicle seat that is employed for a vehicle and is disposed to face toward a front side of the vehicle. Each drawing mainly shows the inner structure of a seat body in order to facilitate understanding of the configuration in the first embodiment. Therefore, with regard to a seat back 2 and a seat cushion 3, each drawing mainly shows the inner frame structure thereof, such as a back frame 2f and a cushion frame 3f that form a frame. Thus, descriptions and illustrations of members fitted to the outside, for example, a cover and a seat pad, may be omitted.

Figure 1:
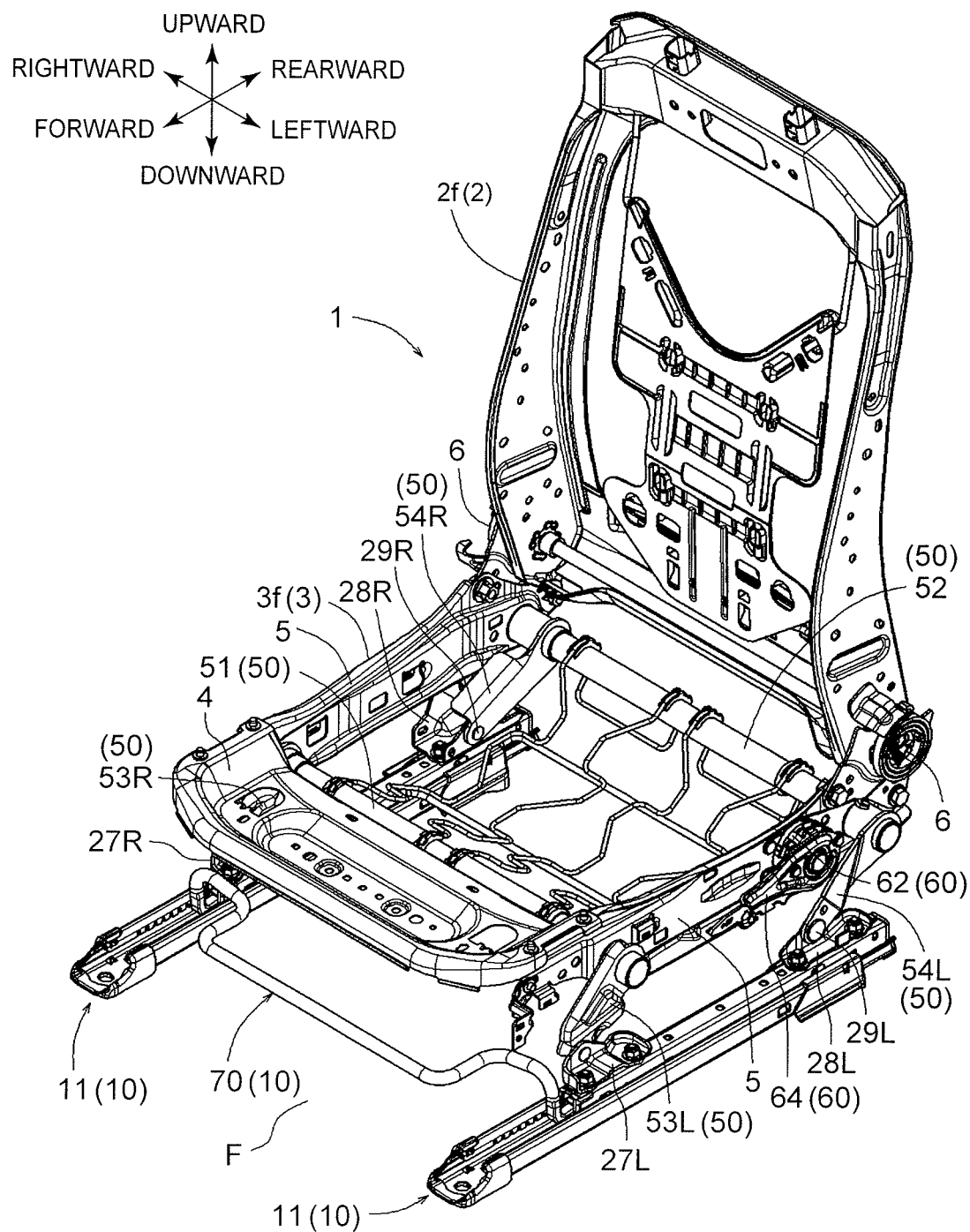
FIG. 1 is a perspective view showing an entire vehicle seat according to a first embodiment of the invention.

As shown in FIG. 1, a vehicle seat includes a seat body 1 that mainly includes the seat back 2 that is a back portion, and the seat cushion 3 that is a seating portion. The seat back 2 includes the back frame 2f that is a frame portion. The back frame 2f is formed to have a substantially rectangular frame shape, by appropriately performing a bending process and a drawing process on a pipe member and a plate member that are made of a steel material. The seat cushion 3 includes the cushion frame 3f that is a frame portion. The cushion frame 3f is formed to have a substantially rectangular frame shape, by appropriately performing a bending process and a drawing process on a pipe member and a plate member that are made of a steel material. In the seat body 1, the back frame 2f is connected to the cushion frame 3f by reclining devices 6 that are provided in a lower portion of the back frame 2f in an up-down direction. Thus, the reclining angle of the seat back 2 with respect to the seat cushion 3 can be adjusted, and the seat back 2 is tiltable forward with respect to the seat cushion 3.

As shown in FIG. 1, the cushion frame 3f mainly includes a front frame 4, lower arms 5, 5, a front rod 51, and a rear rod 52. The cushion frame 3f has a substantially rectangular frame shape. Each of the lower arms 5, 5 is formed by appropriately performing a bending process on an elongated band-shaped plate member. The lower arms 5, 5 are disposed in respective sides of the cushion frame 3f in a width direction at positions above a slide rail device 10 (described later) such that the longitudinal direction of the lower arms 5,5 extends along a vehicle front-rear direction. The front frame 4 is disposed to connect front ends of the lower arms 5, 5, and thus, the front end of the cushion frame 3f is formed. The front rod 51 formed of a pipe member made of steel is disposed to extend in the width direction through front portions of the lower arms 5, 5, and to connect the front portions of the lower arms 5, 5. Similarly, the rear rod 52 formed of a pipe member made of steel is disposed to extend in the width direction through rear portions of the lower arms 5,5, and to connect the rear portions of the lower arms 5, 5. The front rod 51 and the rear rod 52 are rotatable with respect to the lower arms 5, 5.

Figure 2:
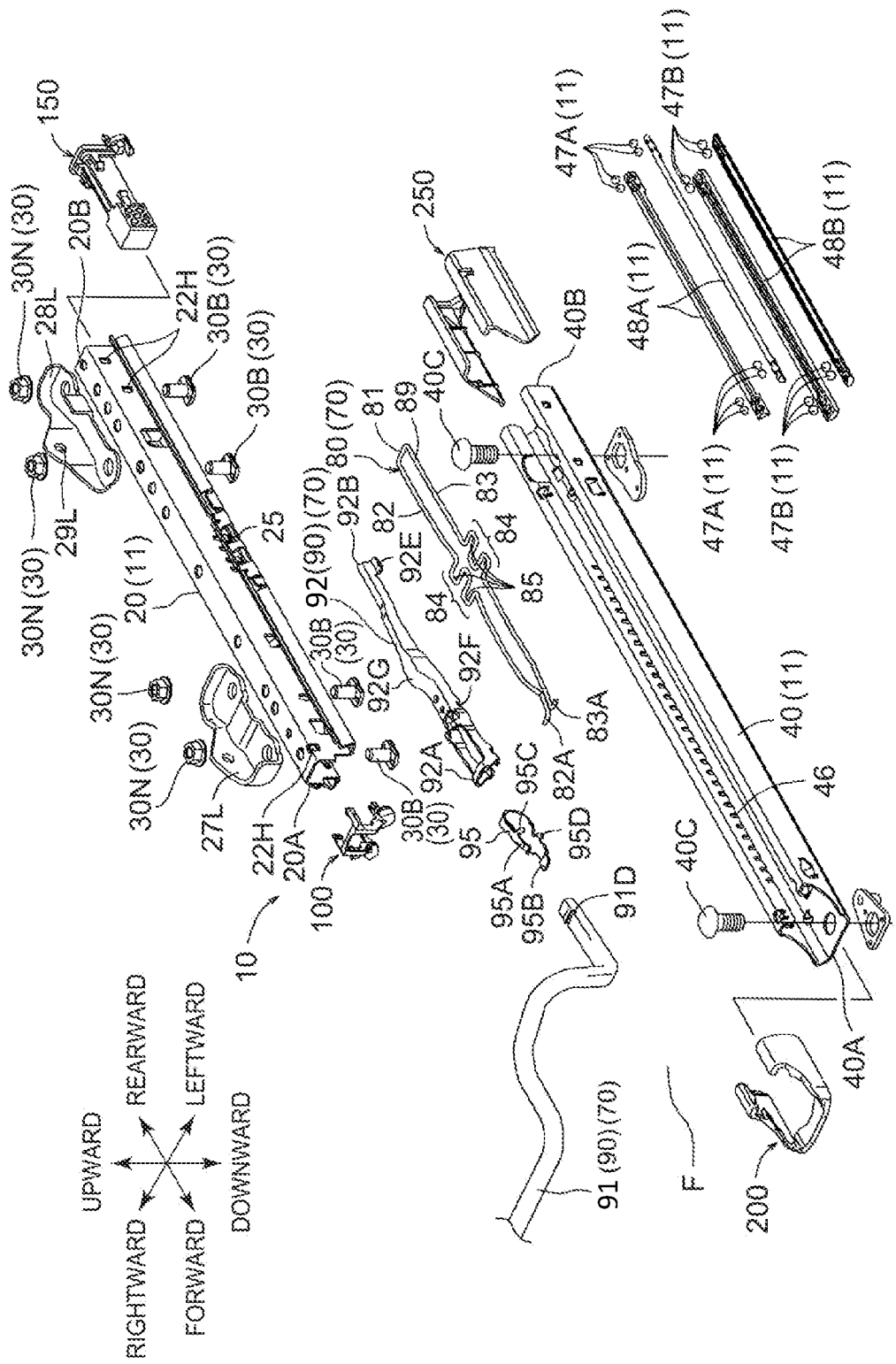
FIG. 2 is an exploded perspective view of a slide rail device in the vehicle seat according to the first embodiment.

As shown in FIG. 1 and FIG. 2, the vehicle seat includes the slide rail device 10 provided between the seat body 1 and a floor surface F of the vehicle (i.e., a vehicle structure member). The slide rail device 10 makes it possible to adjust the seating position of the seat body 1 with respect to the floor surface F in the vehicle front-rear direction. As shown in FIG. 1, the slide rail device 10 includes slide rails 11, 11, and a slide lock mechanism 70. The paired right and left slide rails 11, 11 are disposed between the seat cushion 3 and the floor surface F such that the slide rails 11, 11 extend in the vehicle front-rear direction and in parallel with each other.

As shown in FIG. 1, the slide rails 11, 11 are disposed between the seat body 1 and the floor surface F of the vehicle. The slide rails 11, 11 form a mechanism that moves the seating position of the seat body 1 with respect to the floor surface F in the vehicle front-rear direction. As shown in FIG. 2, each of the slide rails 11, 11 mainly includes a lower rail 40, an upper rail 20, rolling elements 47A, 47B, and guides 48A, 48B. The lower rails 40 extend in the vehicle front-rear direction, and are disposed on the floor surface F. The upper rails 20 are disposed on the side of the seat body 1 (refer to FIG. 1), and are respectively fitted to the lower rails 40 such that the upper rails 20 are slidable with respect to the lower rails 40 in the longitudinal direction of the upper rails 20 and the lower rails 40. More specifically, each of the lower rails 40 and a corresponding one of the upper rails 20 are overlapped with each other via the rolling elements 47A, 47B and the guides 48A, 48B so as to form a tubular shape. Thus, when the upper rails 20 are guided to slide with respect to the lower rails 40 in the vehicle front-rear direction, the seating position of the seat body 1 is moved in the vehicle front-rear direction.

Figure 3:
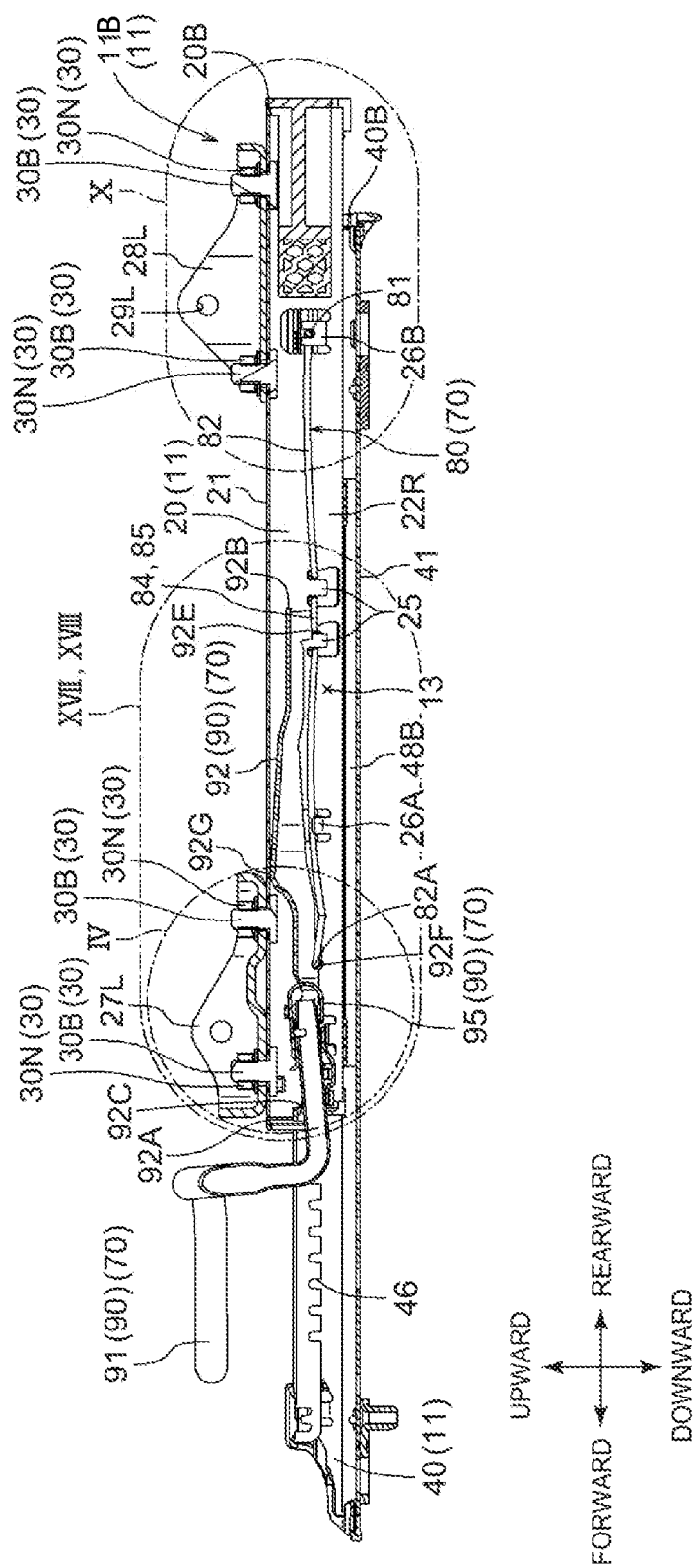
FIG. 3 is a sectional view in a longitudinal direction showing the slide rail device in the vehicle seat according to the first embodiment.

As shown in FIG. 2, each of the lower rails 40 extends in the vehicle front-rear direction, and is disposed on the floor surface F. As shown in FIG. 5, the lower rail 40 is formed as one body having a cross-section described below, by bending portions of one flat plate member made of steel. More specifically, the lower rail 40 includes a lower face portion 41 in the form of a flat plate. The lower face portion 41 is disposed on the floor surface F (FIG. 2) to face the floor surface F and to extend in substantially parallel with the floor surface F. A right side face portion 42R and a left side face portion 42L extend upward from respective ends of the lower face portion 41. Each of the right side face portion 42R and the left side face portion 42L is in the form of a flat plat. A right upper face portion 43R and a left upper face portion 43L respectively extend inward from upper ends of the right side face portion 42R and the left side face portion 42L. Each of the right upper face portion 43R and the left upper face portion 43L is in the form of a flat plate. A right distal end portion 44R and a left distal end portion 44L respectively extend straight and downward from inner end portions of the right upper face portion 43R and the left upper face portion 43L. Each of the right distal end portion 44R and the left distal end portion 44L is in the form of a flat plate. As shown in FIG. 2 and FIG. 3, in the right distal end portion 44R and the left distal end portion 44L, a plurality of lock grooves 46 are disposed adjacent to each other in a slide direction. Each of the lock grooves 46 extends in the up-down direction. An end portion of each of the lock grooves 46 is open.

As shown in FIG. 2, each of the upper rails 20 is disposed on the side of the seat body 1 (refer to FIG. 1), and is fitted to the corresponding lower rail 40 such that the upper rail 20 is slidable with respect to the corresponding lower rail 40 in the rail longitudinal direction. As shown in FIG. 5, the upper rail 20 is formed as one body having a cross-section described below, by bending portions of one flat plate member made of steel. More specifically, the upper rail 20 includes an upper face portion 21 that is in the form of a flat plate. The upper face portion 21 faces the floor surface F and extends in substantially parallel with the floor surface F. A right side face portion 22R and a left side face portion 22L extend straight and downward from respective ends of the upper face portion 21. Each of the right side face portion 22R and the left side face portion 22L is in the form of a flat plate. A right folded face portion 23R and a left folded face portion 23L respectively extend outward from lower ends of the right side face portion 22R and the left side face portion 22L. Each of the right folded face portion 23R and the left folded face portion 23L is a curved surface. A right distal end portion 24R and a left distal end portion 24L respectively extend upward from outer end portions of the right folded face portion 23R and the left folded face portion 23L. Each of the right distal end portion 24R and the left distal end portion 24L has a bent shape. As shown in FIG. 2 and FIG. 3, in the right distal end portion 24R and the left distal end portion 24L of the upper rail 20, cut portions 25 are provided for the lock grooves 46 in the lower rail 40 arranged in the slide direction. Each of the cut portions 25 is formed by partially cutting the right distal end portion 24R and the left distal end portion 24L. The right side face portion 22R and the left side face portion 22L correspond to "paired side face portions" according to the invention.

As shown in FIG. 5, with regard to the lower rail 40 and the upper rail 20, in a cross-section orthogonal to the longitudinal direction, the upper rail 20 is inserted into and disposed inside the lower rail 40, and the right distal end portion 44R and the left distal end portion 44L of the lower rail 40 are overlapped with the right distal end portion 24R and the left distal end portion 24L of the upper rail 20 in a direction orthogonal to the longitudinal direction. Thus, fitting portions 12 that prevent the lower rail 40 and the upper rail 20 from separating from each other are formed.

As shown in FIG. 2, the slide lock mechanism 70 is the mechanism that restrains the slide movement of the slide rail 11 at an appropriate position (a selected position) in the vehicle front-rear direction. The slide lock mechanism 70 mainly includes a lock spring 80 (a lock member, a first urging member), and an operating member 90.

As shown in FIG. 2, the lock spring 80 (the lock member, the first urging member) functions as both of the lock member that restrains the slide movement of the upper rail 20 with respect to the lower rail 40 at an appropriate position (a selected position) to achieve a slide lock state by being engaged with the lock grooves 46 and the cut portions 25, and the first urging member that performs elastic urging, i.e., elastically applies an urging force to maintain the slide lock state. The lock spring 80 is constituted by a linear member 89 that is made of metal and has a uniform cross-section. As shown in FIG. 2 and FIG. 3, the lock spring 80 includes a first linear portion 81 that is disposed to extend in a direction crossing the slide rail 11, and a second linear portion 82 and a third linear portion 83 that extend from respective ends of the first linear portion 81 toward one side in the slide direction of the slide rail 11. The first linear portion 81, the second linear portion 82, and the third linear portion 83 are integrally connected to each other. Thus, the lock spring 80 is constituted by the elongated member having a substantially U-shape. In an intermediate position of each of the second linear portion 82 and the third linear portion 83 in the longitudinal direction thereof, an elastic deformation portion 84 that is elastically deformable in the up-down direction is provided. In each elastic deformation portion 84, engagement grooves 85 that are able to be engaged with the lock grooves 46 and the cut portions 25 are provided. The engagement grooves 85 are formed in a lattice shape such that the engagement grooves 85 are able to receive the lock grooves 46 and the cut portions 25, by repeatedly bending portions of the second linear portion 82 and the third linear portion 83 in a width direction orthogonal to the slide direction of the slide rail 11 (i.e., a direction that is substantially parallel to the first linear portion 81). In the lock spring 80, a spring hook portion 82A is provided at an end portion of the second linear portion 82, and a spring hook portion 83A is provided at an end portion of the third linear portion 83.

As shown in FIG. 3, the lock spring 80 in an urging state is disposed inside the slide rail 11. More specifically, the upper rail 20 includes front support portions 26A and rear support portions 26B that are formed by cutting and bending portions of the right side face portion 22R and the left side face portion 22L. The spring hook portion 82A and the spring hook portion 83A of the lock spring 80 are locked from above by locking portions 92F of a lever member 92 (described later). In the lock spring 80, portions of the second linear portion 82 and the third linear portion 83, which are located between the spring hook portions 82A, 83A and the elastic deformation portion 84, are supported from below by the front support portions 26A. The first linear portion 81 of the lock spring 80 is supported from below by the rear support portions 26B.

As shown in FIG. 2 and FIG. 3, the operating member 90 is a member that transmits, to the lock spring 80, a canceling operating force (in other words, an unlocking operating force) of an operator, in order to cancel the slide lock state in which the lock spring 80 provided as the lock member is engaged with the lock grooves 46 and the cut portions 25. The operating member 90 mainly includes a loop handle 91 (an input operating member), the lever member 92 (an output operating member), and a plate spring 95 (a second urging member). The loop handle 91 is a member that receives the canceling operating force for cancelling the slide lock state of the lock spring 80 in the slide lock mechanism 70 (i.e., a member to which the canceling operating force is input). The lever member 92 is a member that outputs and transmits the canceling operating force of the loop handle 91 to the lock spring 80.

Figure 4:
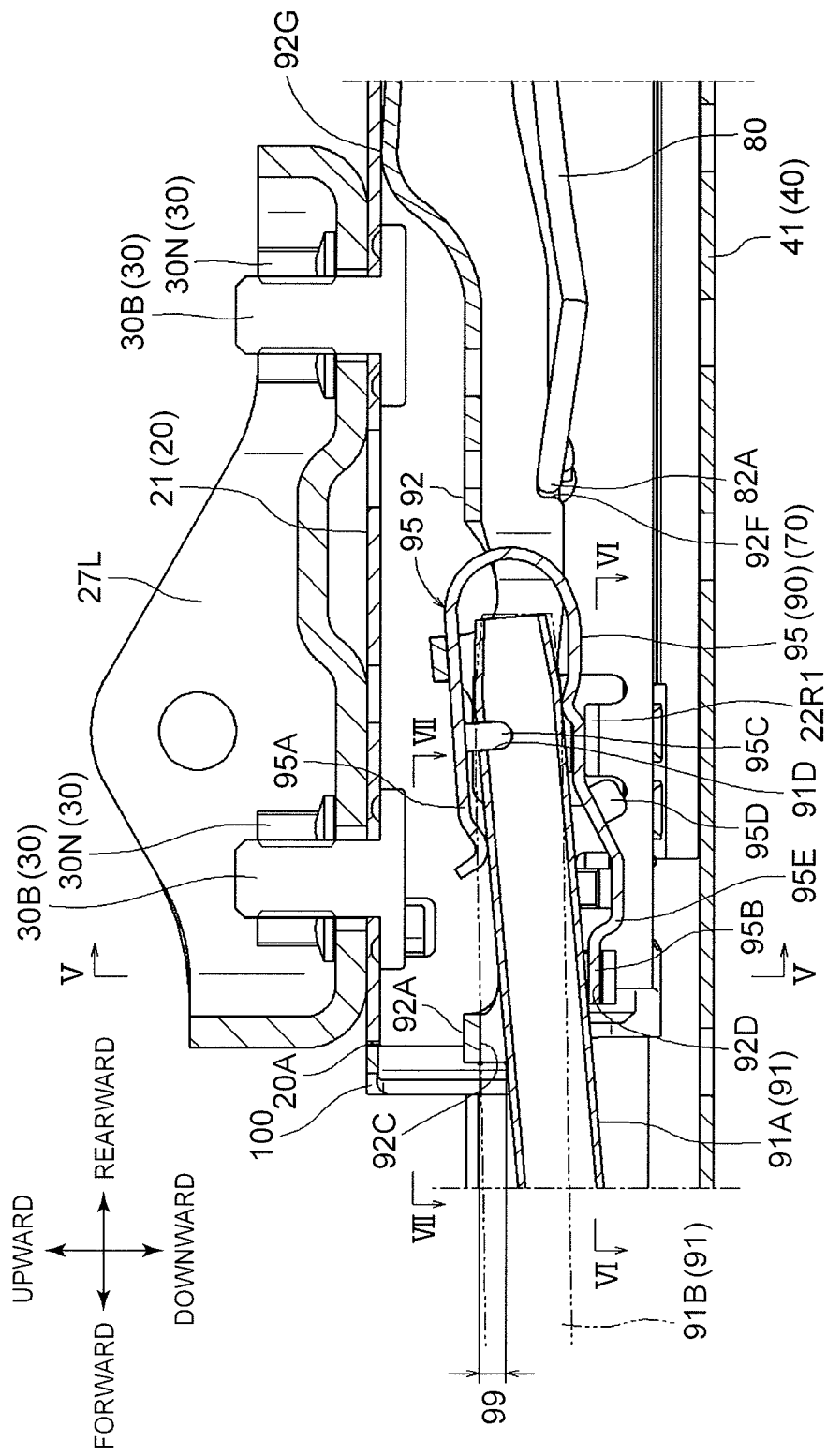
FIG. 4 is a partial sectional view of a portion IV in FIG. 3.
Figure 6:
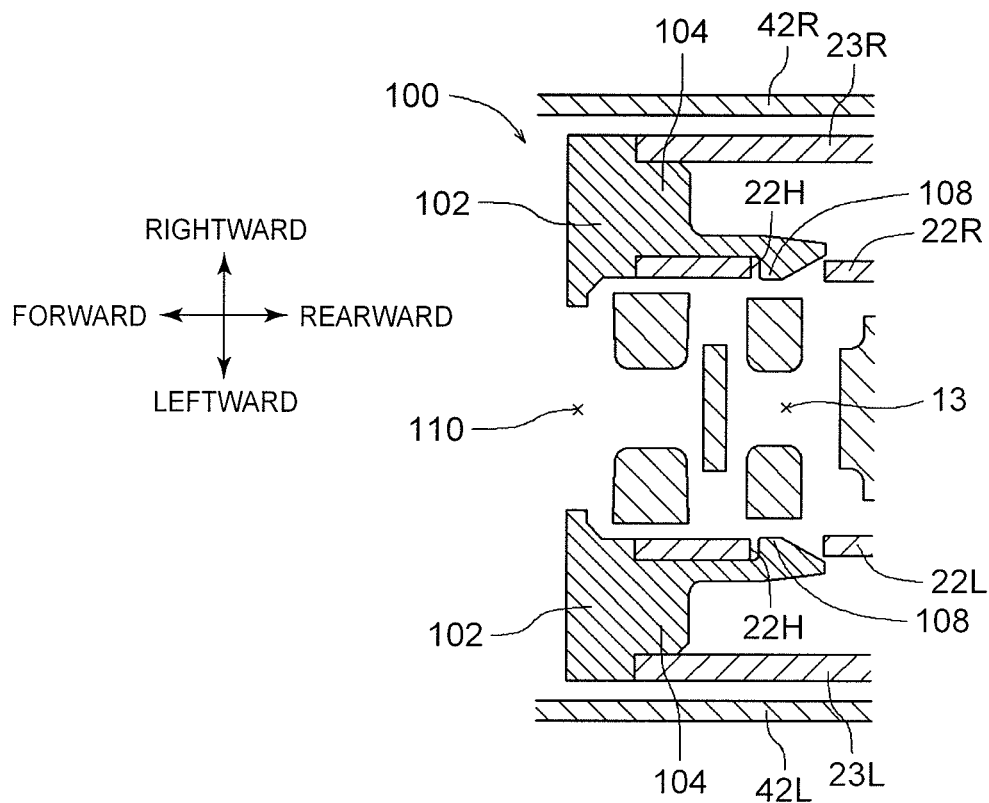
FIG. 6 is a sectional view taken along a line VI-VI in FIG. 4.
Figure 7:
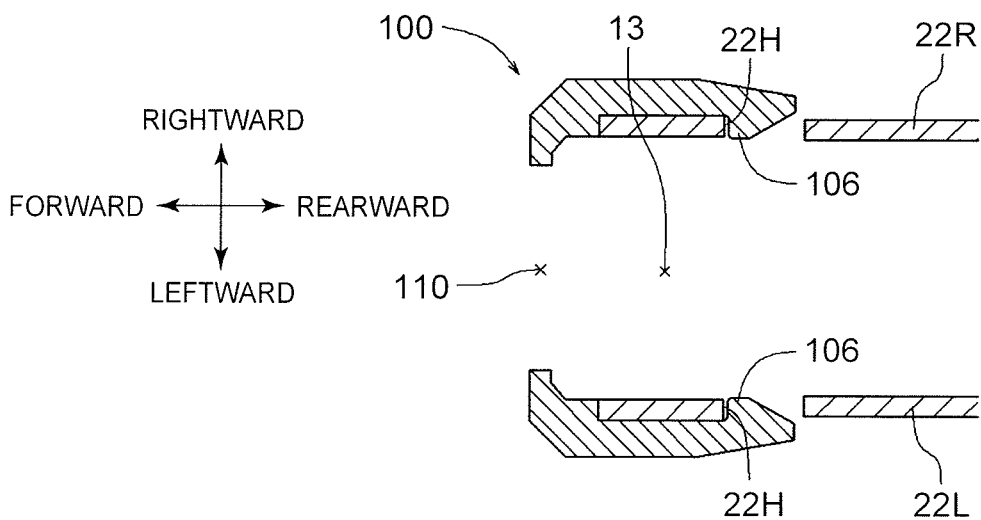
FIG. 7 is a sectional view taken along a line VII-VII in FIG. 4.
Figure 8:
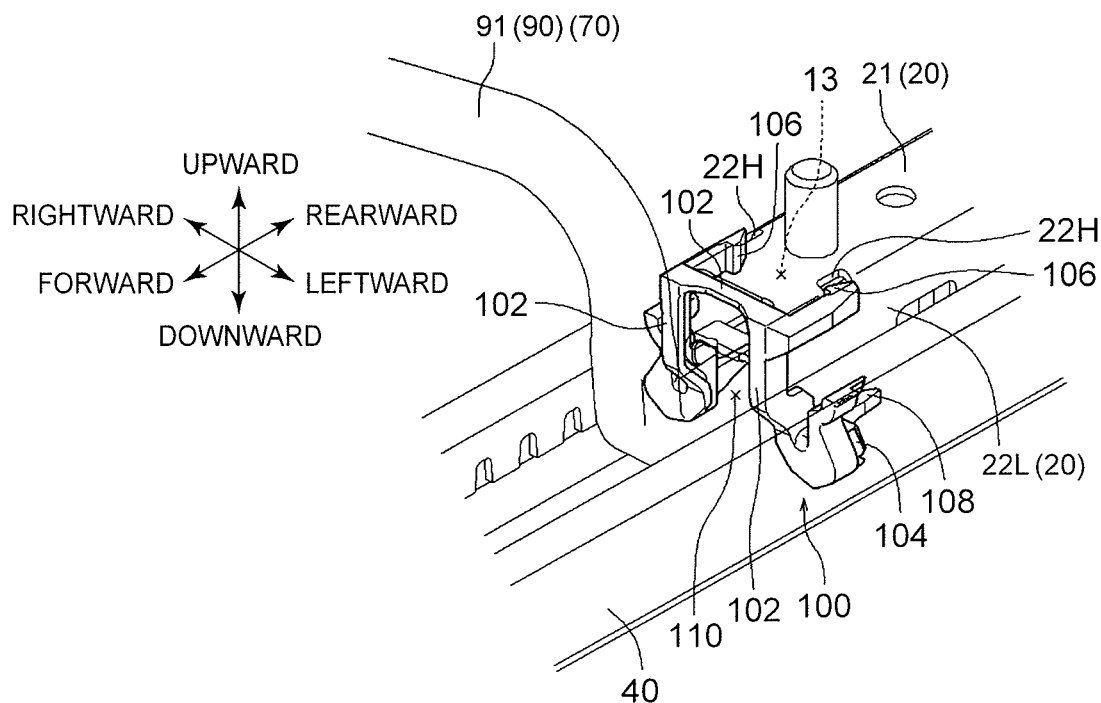
FIG. 8 is a partial perspective view of the portion IV in FIG. 3.
Figure 9:
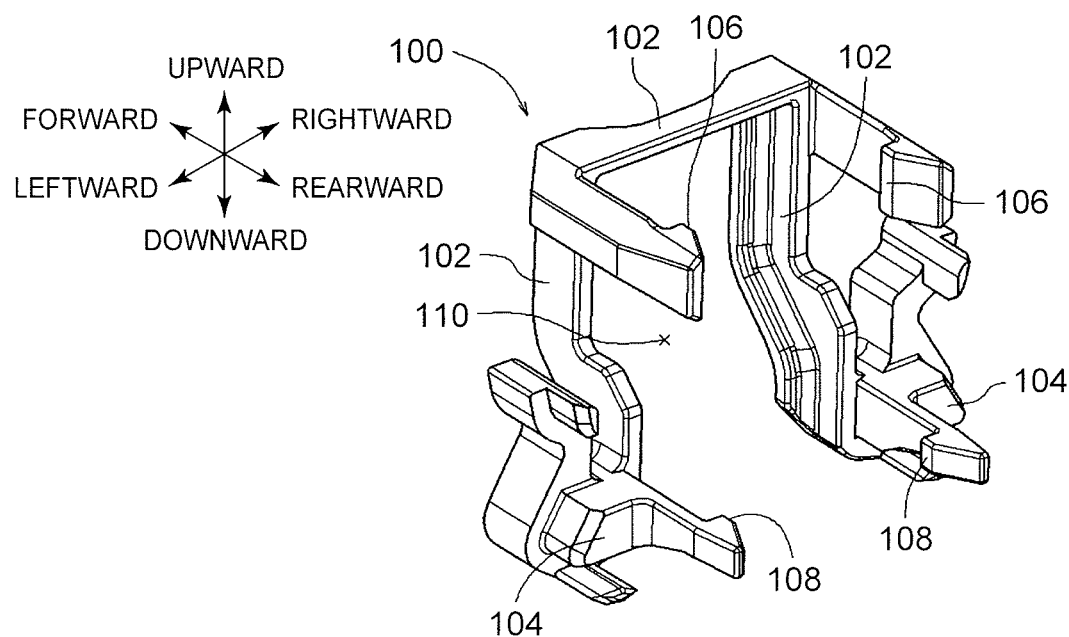
FIG. 9 is a perspective view showing an entire cap fitted to a front end of the slide rail device in the vehicle seat.

The lever member 92 is a member that presses the elastic deformation portions 84 of the lock spring 80 disposed inside the slide rail 11 to elastically deform the elastic deformation portions 84 in the up-down direction such that the engagement grooves 85 are able to be engaged with and disengaged from the lock grooves 46 and the cut portions 25. The lever member 92 is formed as an elongated member, by performing a bending process on a plate member made of metal. As shown in FIG. 3 and FIG. 5, the lever member 92 is disposed in a space portion 13 that is located between the upper face portion 21 of the upper rail 20 and the lower face portion 41 of the lower rail 40, and that is located between the right side face portion 22R and the left side face portion 22L of the upper rail 20 (refer to FIG. 5). As shown in FIG. 3 and FIG. 4, the loop handle 91 (described later) is inserted in a front end 92A-side of the lever member 92. As shown in FIG. 3, pressing portions 92E that press the elastic deformation portions 84 of the lock spring 80 are provided in a rear end 92B-side of the lever member 92. A support point 92G is provided in an upper surface of the lever member 92 at an intermediate position in the longitudinal direction thereof. The support point 92G is a portion of the upper surface of the lever member 92, the portion protruding and contacting the upper face portion 21 of the upper rail 20. In the lever member 92, the locking portions 92F are provided between the front end 92A and the support point 92G. The spring hook portion 82A and the spring hook portion 83A of the lock spring 80 (refer to FIG. 2) are locked to the locking portions 92F.

The loop handle 91 is formed by appropriately performing a bending process on a bar-shaped member made of metal. The loop handle 91 is inserted in the lever member 92 provided in the upper rails 20 of the right and left slide rails 11, 11.

As shown in FIG. 2 to FIG. 4, and FIG. 15 to FIG. 18, the plate spring 95 is formed of a plate member made of metal, and has a substantially U sectional shape. The plate spring 95 is disposed in the front end 92A-side of the lever member 92. An end portion of the loop handle 91 is inserted in an open end side of the plate spring 95. A protruding portion 95C is provided in one end 95A of the plate spring 95. The protruding portion 95C is engaged with an opening portion 91D provided in an upper portion of the loop handle 91 to maintain the loop handle 91 and to prevent from the loop handle 91 from falling off. The one end 95A of the plate spring 95 contacts the loop handle 91 and urges the loop handle 91 downward (in other words, applies an urging force in a downward direction to the loop handle 91). The other end 95B of the plate spring 95 includes a stepped portion 95E having a distal end portion that is bent in a thickness direction, and thus, the stepped portion 95E in the other end 95B is able to contact the rear end side of a stopper 92D. Thus, the plate spring 95 is maintained such that the plate spring 95 is prevented from falling forward from the lever member 92. Protruding portions 95D are provided in the other end 95B of the plate spring 95, and are engaged with cut-bent pieces 22R1, 22L1 that are formed by cutting and bending portions of the right side face portion 22R and the left side face portion 22L of the upper rail 20 (the cut-bent piece 22L1 is provided on the left side face portion 22L-side, but is not shown in the drawing) such that the plate spring 95 and the lever member 92 are maintained and prevented from moving rearward.

Figure 17:
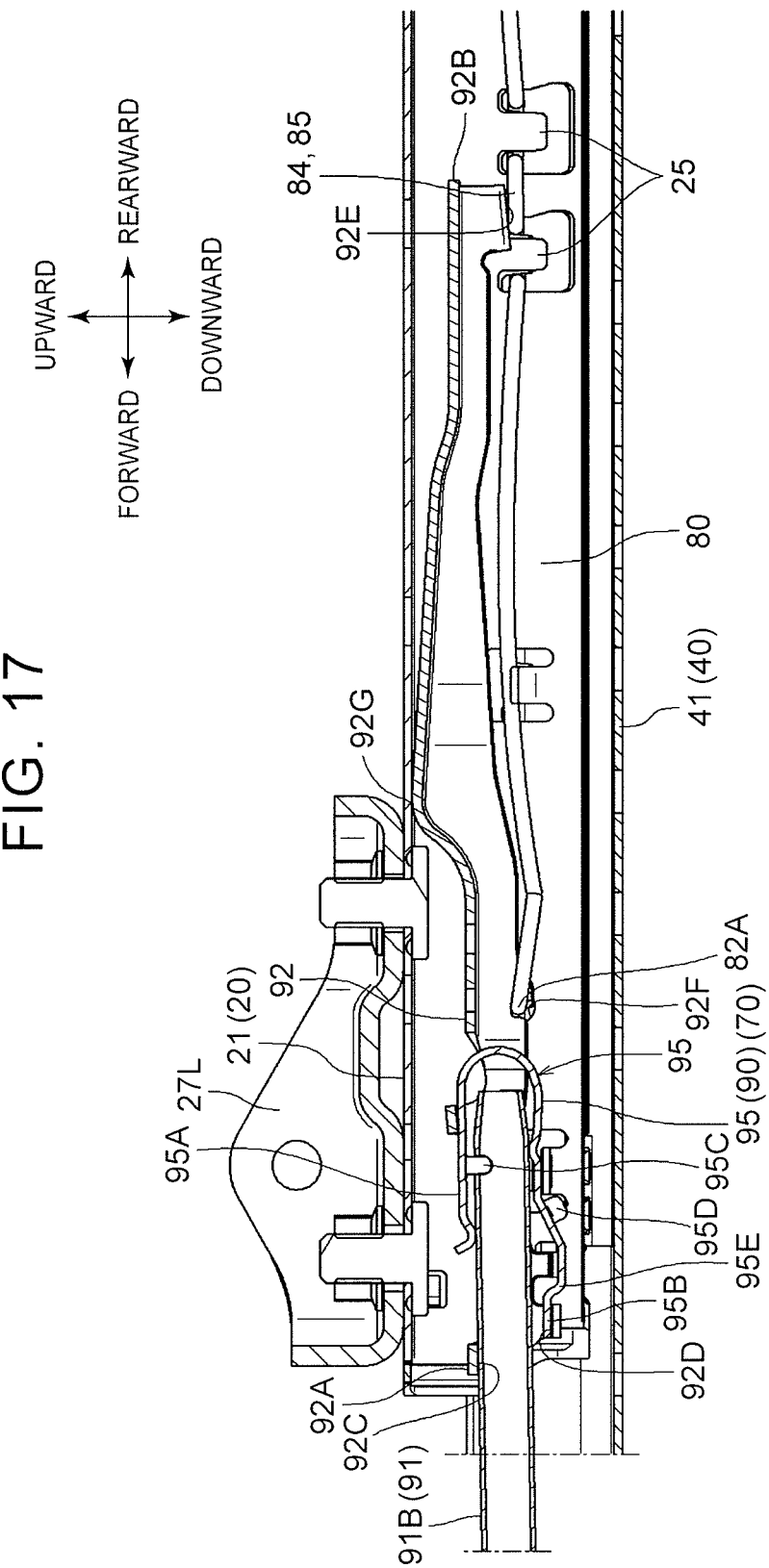
FIG. 17 is a partial sectional view of a portion XVII in FIG. 3.
Figure 18:
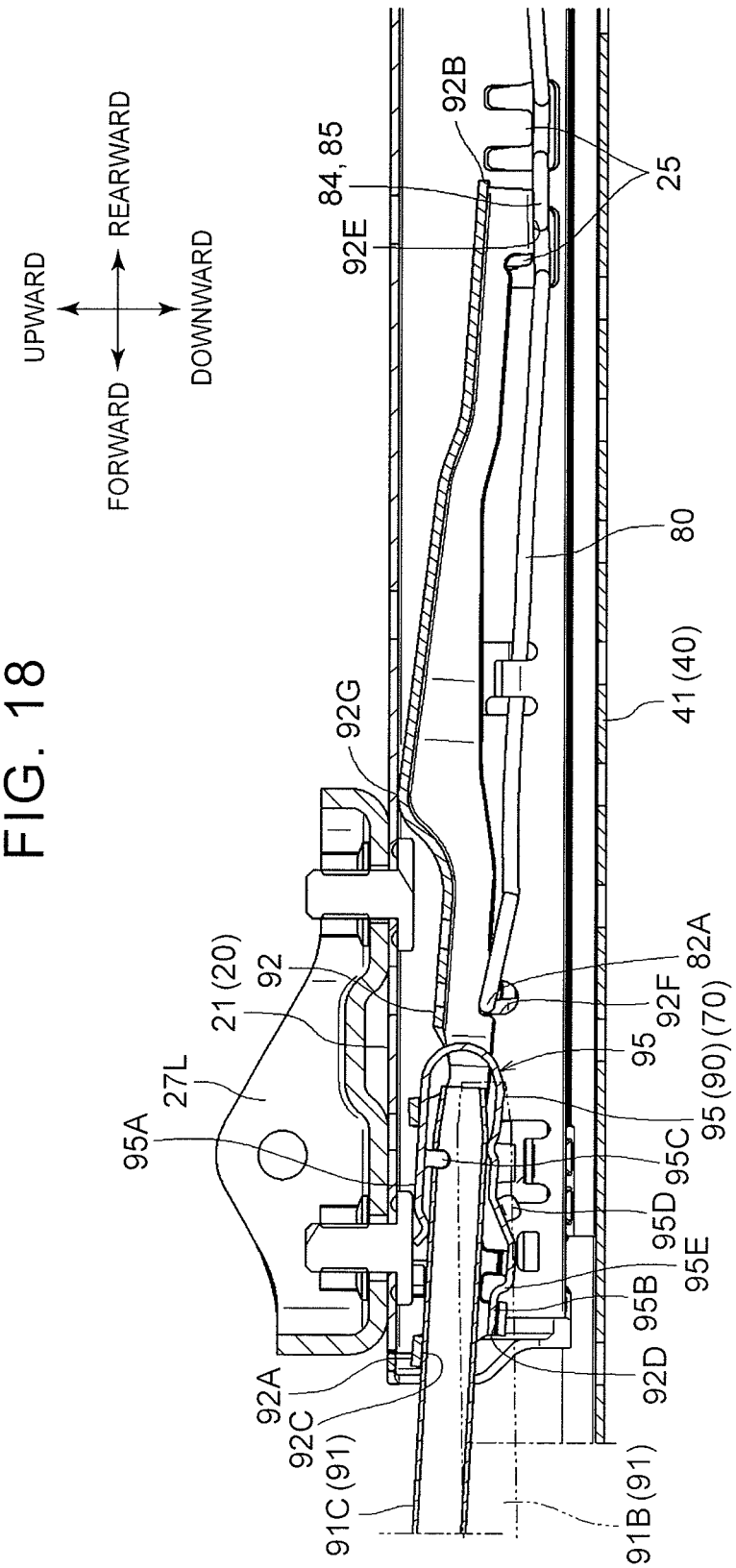
FIG. 18 is a partial sectional view of a portion XVIII in FIG. 3.

The urging force of the lock spring 80 is set to be larger than the urging force of the plate spring 95. In the front end 92A of the lever member 92, a stopper 92C and the stopper 92D are provided. An upper portion of an outer peripheral surface of the loop handle 91 contacts the stopper 92C. A lower portion of the outer peripheral surface of the loop handle 91 contacts the stopper 92D via the other end 95B of the plate spring 95. Thus, since the plate spring 95 is provided between the loop handle 91 and the lever member 92, the loop handle 91 is fitted (connected) to the lever member 92 so as to be rotatable (movable) in the vehicle up-down direction relative to the lever member 92 between an initial position 91A at which the loop handle 91 contacts the stopper 92D due to the urging force of the plate spring 95, and a first operation position 91B at which the loop handle 91 contacts the stopper 92C due to the operating force of the operator that acts against the urging force of the plate spring 95. The loop handle 91 is normally located at the initial position 91A shown in FIG. 4 due to the urging force of the plate spring 95. A clearance 99 (for play) that allows the loop handle 91 to rotate (move) relative to the lever member 92 is provided between the upper portion of the outer peripheral surface of the loop handle 91 at the initial position 91A and the stopper 92C of the lever member 92. When the operating force is applied to the loop handle 91 to move the loop handle 91 upward, the loop handle 91 is moved in the clockwise direction in FIG. 4 (the loop handle 91 is rotated in the clearance 99) against the urging force of the plate spring 95 until the loop handle 91 contacts the stopper 92C. When the loop handle 91 is further operated from the first operation position 91B at which the loop handle 91 contacts the stopper 92C of the lever member 92 as shown in FIG. 17, the loop handle 91 moves the front end 92A-side of the lever member 92 upward. In this case, while the loop handle 91 is in contact with the stopper 92C, no further urging force of the plate spring 95 is applied (in other words, the urging force of the plate spring 95 does not increase). In this state, the lever member 92 rotates in the clockwise direction in FIG. 17 about the support point 92G, and the lever member 92 reaches a second operation position 91C at which the pressing portions 92E (refer to FIG. 3) move downward against the urging force of the lock spring 80. As shown in FIG. 18, when the lever member 92 is located at the second operation position 91C (in other words, when the loop handle 91 is located at the second operation position 91C), the pressing portions 92E (refer to FIG. 3) press and elastically deform the elastic deformation portions 84 of the lock spring 80 such that the engagement grooves 85 are disengaged from the lock grooves 46 and the cut portions 25 (refer to FIG. 2 and FIG. 3).

In the first embodiment, the stepped portion 95E in the other end 95B of the plate spring 95 contacts the stopper 92D, and the protruding portions 95D are engaged with the cut-bent pieces 22R1, 22L1 that are formed by cutting and bending portions of the right side face portion 22R and the left side face portion 22L of the upper rail 20. Various configurations may be employed as the configuration for fitting the plate spring 95. In a configuration in which the other end 95B of the plate spring 95 is inserted in the cut-bent pieces 22R1, 22L1, even when the loop handle 91 is moved from the first operation position 91B to the second operation position 91C, the urging force of the plate spring 95 is applied. Therefore, a canceling operating force that needs to be applied to the loop handle 91 is increased by an amount corresponding to the urging force of the plate spring 95 (an additional canceling operating force corresponding to the urging force of the plate spring 95 needs to be applied to the loop handle 91). Accordingly, the operator is unlikely to feel that the loop handle 91 is continuously (smoothly) operated to apply the canceling operating force. However, in the first embodiment, while the loop handle 91 is moved from the first operation position 91B to the second operation position 91C (while the loop handle 91 is in contact with the stopper 92C), no further urging force of the plate spring 95 is applied (in other words, the urging force of the plate spring 95 does not increase). Thus, while the loop handle 91 is moved from the initial position 91A to the first operation position 91B, the urging force of the plate spring 95 (the second urging member) is applied, and while the loop handle 91 is moved from the first operation position 91B to the second operation position 91C, the urging force of the lock spring 80 (the first urging member) is applied. Thus, the operator feels that the loop handle 91 is continuously (smoothly) operated to apply the canceling operating force for canceling the slide lock state. In other words, when the loop handle 91 is moved from the initial position 91A to the first operation position 91B, the lock canceling force (the canceling operating force) is transmitted to the lever member 92 via the plate spring 95 (the second urging member) (against the urging force of the plate spring 95). When the loop handle 91 is moved from the first operation position 91B to the second operation position 91C, the lock canceling force (the canceling operating force) is transmitted to the lever member 92 against the urging force of the lock spring 80. Thus, the operator feels that the loop handle 91 is continuously (smoothly) operated to apply the lock canceling force (the operator feels that the lock canceling force is continuously (smoothly) applied).

As shown in FIG. 1 and FIG. 2, a link mechanism 50 is provided between the cushion frame 3f of the seat body 1 in the vehicle seat and the slide rail device 10. The link mechanism 50 includes the front rod 51, the rear rod 52, front links 53R, 53L, and rear links 54R, 54L. The front links 53R, 53L are integrally fixed to respective ends of the front rod 51. Each of the front links 53R, 53L is formed of a plate member made of steel. Similarly, the rear links 54R, 54L are integrally fixed to respective ends of the rear rod 52. Each of the rear links 54R, 54L is formed of a plate member made of steel. The front links 53R, 53L at the respective ends of the front rod 51 are fitted so as to be rotatable via the brackets 27R, 27L, respectively. Each of the brackets 27R, 27L is fitted to the upper face portion 21 of the corresponding upper rail 20 using a fastening member 30 including bolts 30B and nuts 30N such that a rotation shaft of a corresponding one of the front links 53R, 53L is located between portions of the bracket 27R or 27L in the front-rear direction. Similarly, the rear links 54R, 54L at the respective ends of the rear rod 52 are respectively fitted to link rotation shafts 29R, 29L that are rotatable, via the brackets 28R, 28L. Each of the brackets 28R, 28L is fitted to the upper face portion 21 of the corresponding upper rail 20 using the fastening member 30 including the bolts 30B and the nuts 30N such that a corresponding one of the link rotation shafts 29R, 29L for the rear links 54R, 54L is located between portions of the bracket 28R or 28L in the front-rear direction. Each link in the link mechanism 50 is rotated by the operation of a lift mechanism 60.

For example, in the case where the lift mechanism 60 is provided in a front passenger seat as shown in FIG. 1, the lift mechanism 60 is disposed outside the seat cushion 3 (i.e., on the left side of the seat cushion 3 in FIG. 1 in a state in which the occupant is seated). The lift mechanism 60 mainly includes a pinion gear (not shown), an operating pivot member 62, a lifter lever 64, and a sector gear (not show). In the lift mechanism 60, the operating pivot member 62 and the lifter lever 64 are disposed outside the lower arm 5, and the pinion gear (not shown) and the sector gear (not shown) are disposed inside the lower arm 5. The sector gear is integrally fixed to the rear rod 52, and is engaged with the pinion gear. The pinion gear is connected to the operating pivot member 62 via a hole (not shown) provided in the lower arm 5, and the operating pivot member 62 is connected to the lifter lever 64.

As shown in FIG. 1, when a rotational operating force is applied to the lifter lever 64, the pinion gear is rotated, and the rotational operating force is transmitted to the sector gear, and thus, the rear rod 52 is rotated. As the rear rod 52 is rotated in one direction, the rear link 54R and the rear link 54L are rotated forward in FIG. 1 (in other words, in the counter-clockwise direction in FIG. 1) about link rotation shafts 29R, 29L in the brackets 28R, 28L. Thus, the seat body 1 is moved forward and upward. When the rotational operating force is applied to the lifter lever 64 such that the pinion gear is rotated in a reverse direction, the rear rod 52 is rotated in the reverse direction. As the rear rod 52 is rotated in the reverse direction, the rear link 54R and the rear link 54L are rotated rearward in FIG. 1 (in other words, in the clockwise direction in FIG. 1) about the link rotation shafts 29R, 29L in the brackets 28R, 28L. Thus, the seat body 1 is moved rearward and downward. The front rod 51 and the front links 53R, 53L are rotated in the same direction in accordance with the above-mentioned movement of the seat body 1. In the lift mechanism 60, when the rotational operating force is not applied, the braking force of the operating pivot member 62 acts to restrain the rotation of the pinion gear. Accordingly, the rotation of the rear rod 52 is restrained, and thus, the position of the seat body 1 in the up-down direction is maintained.

As shown in FIG. 2, caps 100 and 150, and caps 200 and 250 are respectively provided in the upper rail 20 and the lower rail 40 of the slide rail 11 to protect end portions thereof. The caps 100, 150, 200, 250 are made of synthetic resin, and are fitted in the rail end portions. Further, each of the caps 100, 150 provided in the upper rail 20 has a structure for preventing deformation of the corresponding end portion of the upper rail 20. By providing the caps 100, 150, 200, 250, it is possible to prevent, for example, relative torsion (twisting) of the rails in the slide rail.

As shown in FIG. 6 to FIG. 9, the cap 100 is provided in a front end side (a front end portion 20A) of the upper rail 20 in the longitudinal direction (i.e., the vehicle front-rear direction). The cap 100 includes a base portion 102 that has substantially the same shape as the shape of the end face of the upper rail 20, and that is adjacent to, and extends along the end face of the upper rail 20. The cap 100 includes gap filling portions 104 which respectively fill gaps in a separation direction in which the lower rail 40 and the upper rail 20 are separated from each other in the fitting portions 12, in a cross-section orthogonal to the longitudinal direction of the lower rail 40 and the upper rail 20. The gap filling portions 104 extend from the base portion 102 toward a center of the upper rail 20 in the longitudinal direction. The gap filling portions 104 are respectively provided in the gaps in the separation direction in which the lower rail 40 and the upper rail 20 are separated from each other in the fitting portions 12, the gaps respectively corresponding to the right distal end portion 44R and the left distal end portion 44L. More specifically, the gap filling portions 104 have the shapes that fill the gaps between the right distal end portion 44R and the left distal end portion 44L of the lower rail 40 and the right folded face portion 23R and the left folded face portion 23L of the upper rail 20. The cap 100 includes lug portions that are fitted by being engaged with hole portions 22H provided in the right side face portion 22R (refer to FIG. 5) and the left side face portion 22L (refer to FIG. 8) of the upper rail 20. The lug portions include paired first lug portions 106 provided in an upper side, and paired second lug portions 108 provided in a lower side. The paired first lug portions 106 and the paired second lug portions 108 extend from the base portion 102 toward the center of the upper rail 20 in the longitudinal direction. The paired first lug portions 106 and the paired second lug portions 108 of the cap 100 are engaged, from outside, with the hole portions 22H provided in the right side face portion 22R (refer to FIG. 5) and the left side face portion 22L (refer to FIG. 8) of the upper rail 20. The base portion 102 of the cap 100 has an opening portion 110 that allows the operating member 90 to move into (to be inserted into) the space portion 13 of the slide rail 11. The hole portions 22H, with which the paired first lug portions 106 and the paired second lug portions 108 are engaged, may be provided in the upper face portion 21 of the upper rail 20.

As described above, the cap 100 includes the base portion 102 that has substantially the same shape as the shape of the end face of the end portion, in the longitudinal direction, of the upper rail 20 in which the cap 100 is provided. The base portion 102 is adjacent to, and extends along the end face of the upper rail 20 in the longitudinal direction. Therefore, the base portion 102 of the cap 100 can protect the end portion of the upper rail 20. The cap 100 includes the gap filling portions 104 that respectively fill the gaps in the separation direction in which the lower rail 40 and the upper rail 20 are separated from each other in the fitting portions 12. The gap filling portions extend from the base portion 102 to the center, in the longitudinal direction, of the upper rail 20 in which the cap 100 is provided. Thus, when a large load is applied to the lower rail 40 and the upper rail 20 in such a direction as to separate the lower rail 40 and the upper rail 20 from each other due to a vehicle collision or the like, the gap filling portions 104 of the cap 100 can reduce or suppress the backlash (relative movement in the up-down direction) of the lower rail 40 and the upper rail 20, thereby increasing rail rigidity. Since the rail rigidity is increased, it is possible to prevent the deformation of the end portions of the lower rail 40 and the upper rail 20. Thus, it is possible to protect the end portion of the upper rail 20, and to prevent the deformation of the end portions of the lower rail 40 and the upper rail 20.

The gap filling portions 104 are respectively provided in the gaps in the separation direction in which the lower rail 40 and the upper rail 20 are separated from each other in the fitting portions 12, the gaps respectively corresponding to the right distal end portion 44R and the left distal end portion 44L (i.e., the paired distal end portions on an inner side). The gap filling portions 104 are provided in the above-mentioned manner, because the backlash of the lower rail 40 and the upper rail 20 is pronounced at the right distal end portion 44R and the left distal end portion 44L when a large load is applied to the lower rail 40 and the upper rail 20 in such a direction as to separate the lower rail 40 and the upper rail 20 from each other, due to a vehicle collision or the like. Thus, by providing the gap filling portions 104 in the above-described positions, it is possible to further prevent the deformation of the end portions of the lower rail 40 and the upper rail 20, and to further increase the rigidity.

The cap 100 is fitted to the upper rail 20 by engaging the first lug portion 106 and the second lug portion 108 with the hole portions 22H. Thus, the cap 100 is fitted to the upper rail 20 without the need of fixing the cap 100 using a fastening member or the like. Accordingly, by using the cap 100, it is possible to reduce the number of components, and to increase efficiency of a fitting operation.

The first lug portion 106 and the second lug portion 108 are engaged, from outside, with the hole portions 22H provided in at least one of side face portions of the upper rail 20. Therefore, it is possible to reduce or suppress interference between the lower rail 40 and the upper rail 20 when the upper rail 20 slides.

The lock spring 80 (the lock member) is disposed in the space portion 13 formed between the lower face portion 41 of the lower rail 40 and the upper face portion 21 of the upper rail 20. The operating member 90 is inserted through the end portions of the lower rail 40 and the upper rail 20 in the longitudinal direction, and is engaged with the lock spring 80. Thus, since the slide lock mechanism 70 is disposed inside the slide rail 11, a space around the slide rail 11 can be effectively used. In the above-mentioned configuration, since the operating member 90 is inserted through the end portion of the slide rail 11 in the longitudinal direction, there may be a concern that the operating member 90 may interfere with the cap 100. However, the base portion 102 of the cap 100 has the opening portion 110 that allows the operating member 90 to be inserted. Thus, since the base portion 102 of the cap 100 has the opening portion 110, it is possible to protect the rail end portion of the upper rail 20, and to prevent the deformation of the end portion of the upper rail 20, in the configuration where the operating member 90 is inserted through the end portion of the slide rail 11 in the longitudinal direction to operate the lock spring 80 disposed inside the slide rail 11.

In the above-mentioned configuration, the cap 100 is provided in the front end portion 20A of the upper rail 20. However, the cap 100 may be provided in a rear end portion 20B of the upper rail 20. Further, in the above-mentioned configuration, the gap filling portion 104 of the cap 100 is provided in the upper rail 20. However, the gap filling portion 104 may be provided in a front end portion 40A and/or a rear end portion 40B of the lower rail 40. In the above-mentioned configuration, the gap filling portions 104 are respectively provided in the gaps in the separation direction, the gaps respectively corresponding to the right distal end portion 44R and the left distal end portion 44L of the lower rail 40. However, the gap filling portion 104 may be provided at various positions, as long as the gap filling portion 104 fills the gap in the separation direction in which the lower rail 40 and the upper rail 20 are separated from each other, in the fitting portion 12 that prevents separation of the lower rail 40 and the upper rail 20.

Figure 10:
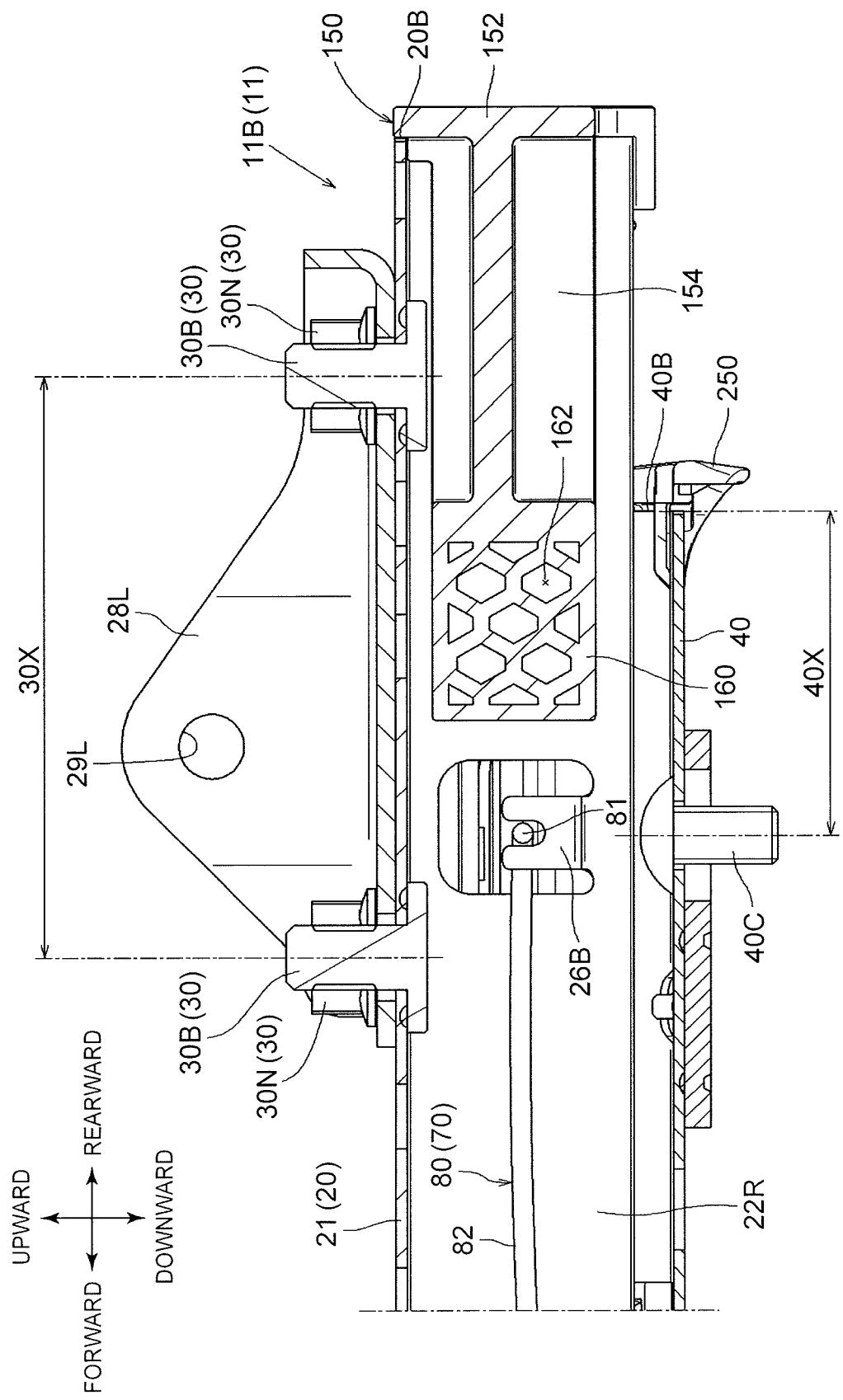
FIG. 10 is a partial sectional view of a portion X in FIG. 3.
Figure 11:
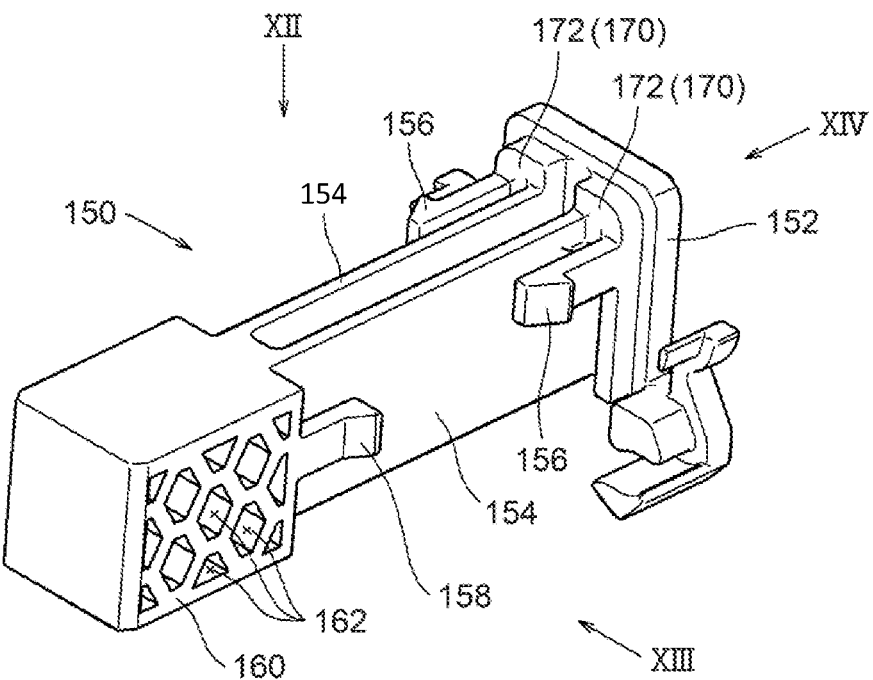
FIG. 11 is a perspective view showing an entire cap fitted to a rear end of the slide rail device in the vehicle seat.
Figure 12:
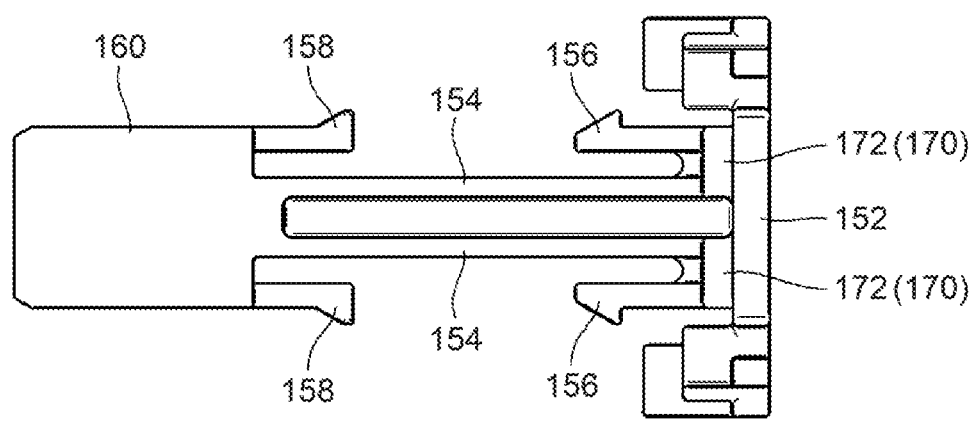
FIG. 12 is a top view of the cap fitted to the rear end of the slide rail device in the vehicle seat viewed in a direction shown by the arrow XII in FIG. 11.
Figure 13:
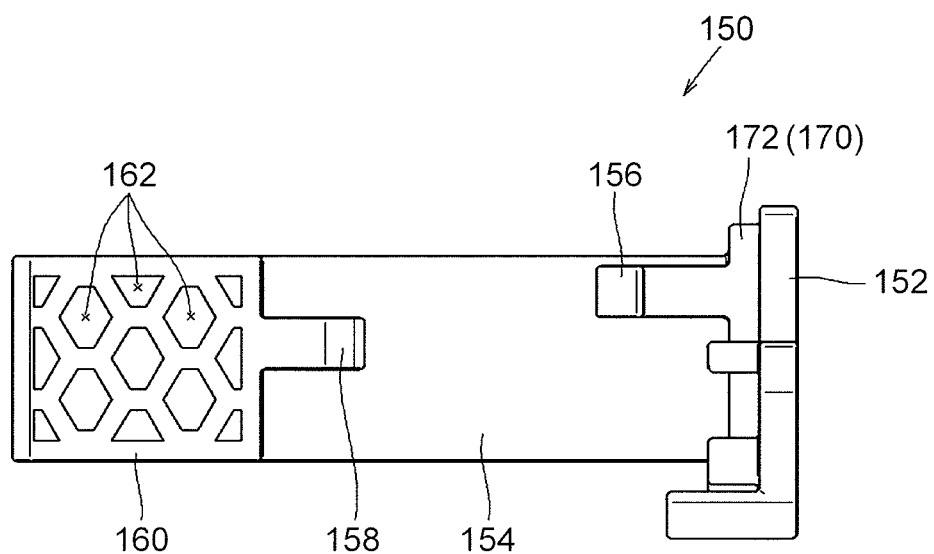
FIG. 13 is a front view of the cap fitted to the rear end of the slide rail device in the vehicle seat viewed in a direction shown by the arrow XIII in FIG. 11.
Figure 14:
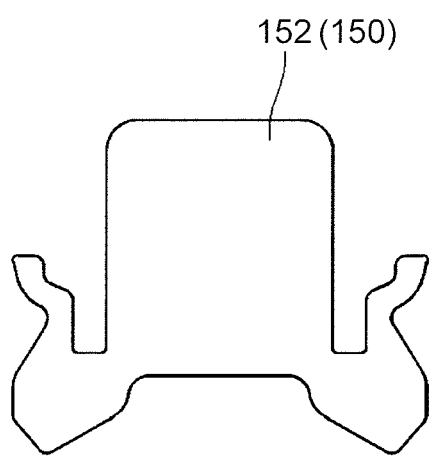
FIG. 14 is a side view of the cap fitted to the rear end of the slide rail device in the vehicle seat viewed in a direction shown by the arrow XIV in FIG. 11.
Figure 15:
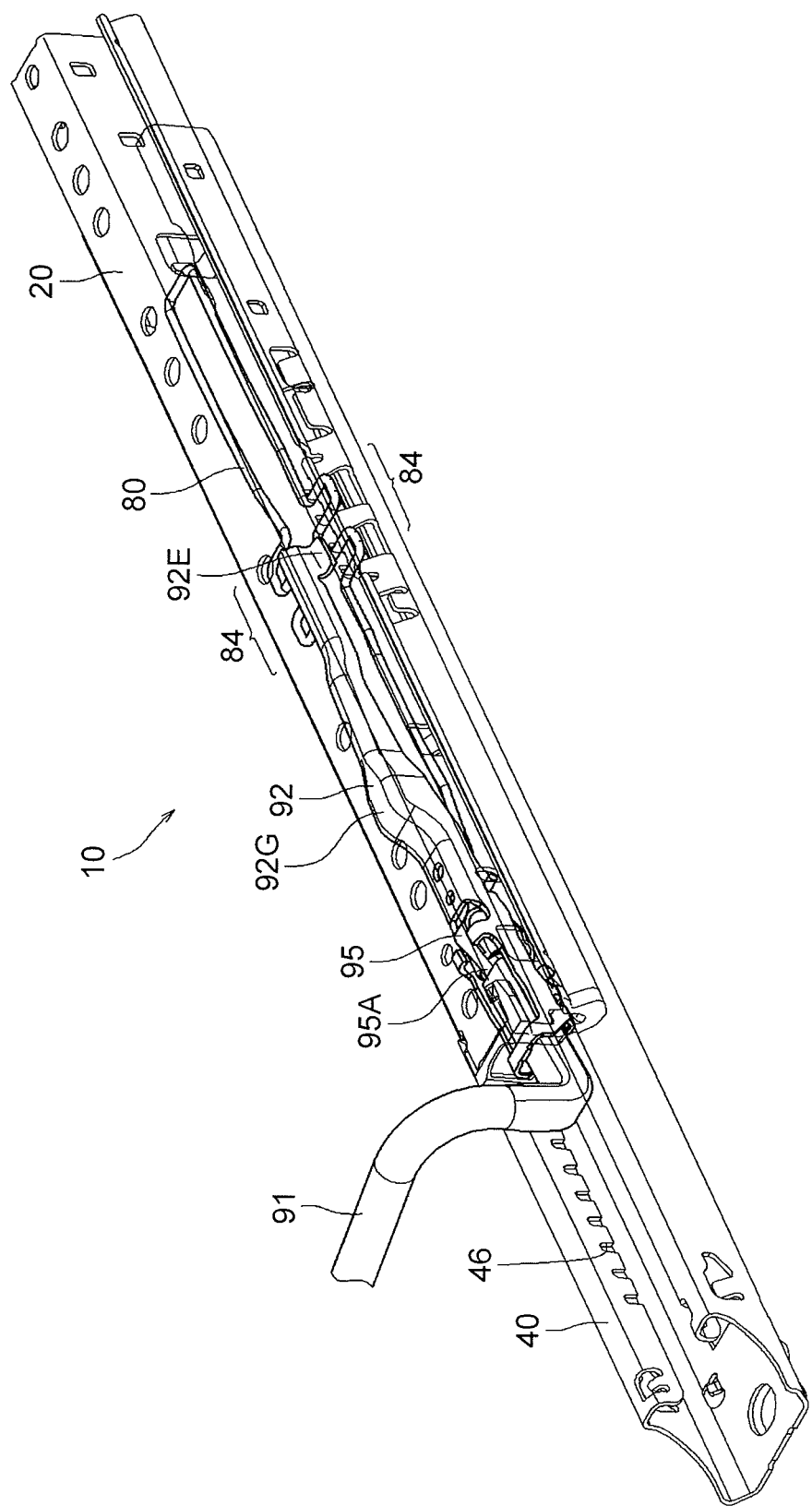
FIG. 15 is a perspective view showing arrangement of a slide lock mechanism and an operating member in the slide rail device in the vehicle seat according to the first embodiment when the arrangement is seen from above.
Figure 16:
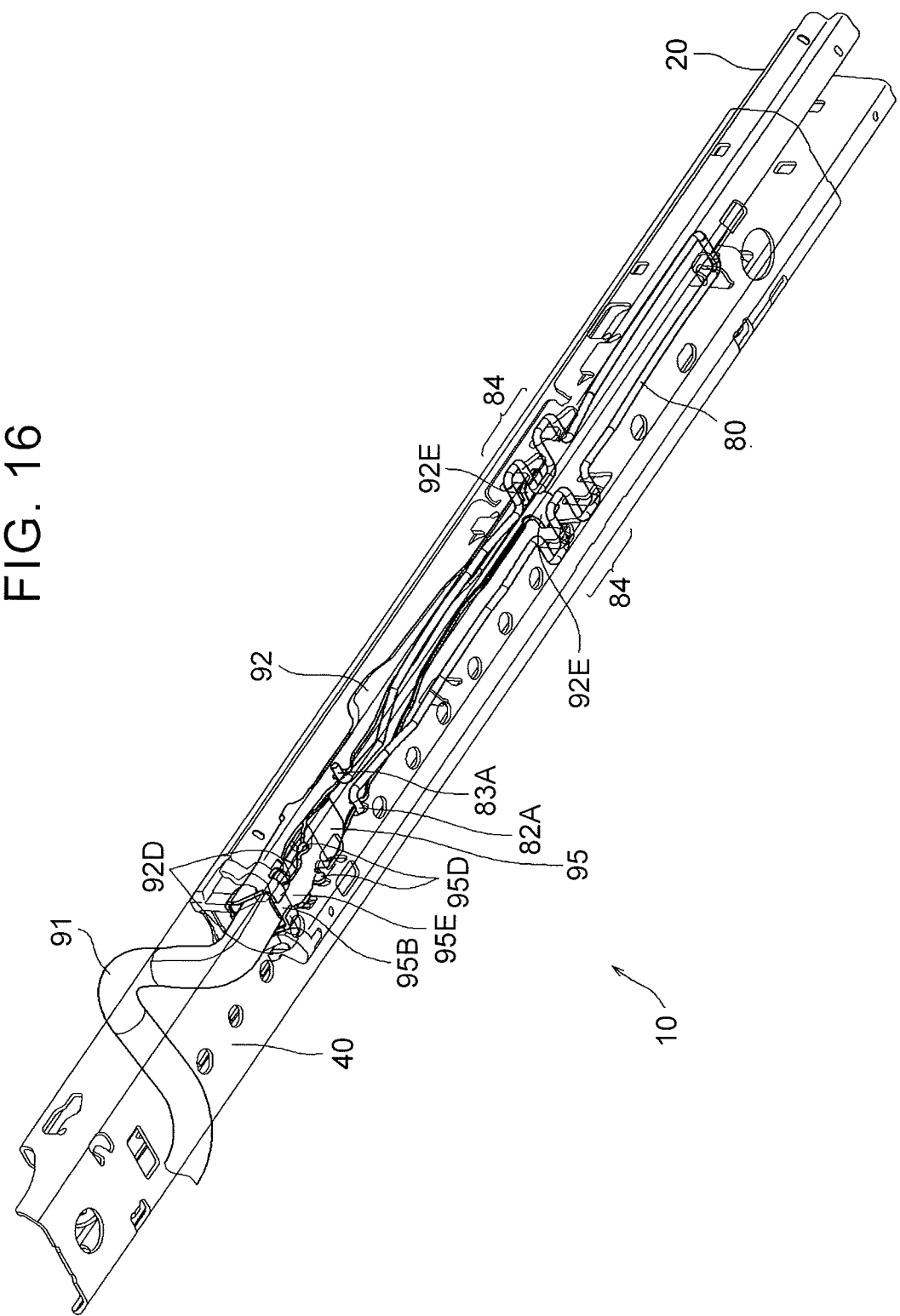
FIG. 16 is a perspective view showing the arrangement of the slide lock mechanism and the operating member in the slide rail device in the vehicle seat according to the first embodiment when the arrangement is seen from below.

As shown in FIG. 10 to FIG. 14, the cap 150 is provided in the rear end portion 20B of the upper rail 20 to protect the rear end portion 20B of the upper rail 20, and to reduce or suppress the deformation of the upper rail 20, thereby reducing or suppressing the separation of the upper rail 20 from the lower rail 40. The cap 150 includes a base portion 152 that is in a form of a flat plate, and that is provided adjacent to the rear end portion 20B, in the longitudinal direction, of the upper rail 20 in which the cap 150 is provided. As shown in FIG. 14, the base portion 152 has a shape approximate to (close to) the shape of the space portion 13 (refer to FIG. 5) and the shapes of the right distal end portion 24R and the left distal end portion 24L (refer to FIG. 5), in order to protect the rear end portion 20B of the upper rail 20. As shown in FIG. 10, the cap 150 includes a first deformation prevention portion 160 that is provided at a position away from the base portion 152 to extend in the space portion 13 toward the center of the upper rail 20 in the longitudinal direction, and that is disposed in the space portion 13 at a position between the right side face portion 22R and the left side face portion 22L (refer to FIG. 5) so as to reduce or suppress the rail deformation. The first deformation prevention portion 160 is cubic such that the first deformation prevention portion 160 faces the upper face portion 21, the right side face portion 22R, and the left side face portion 22L that define the space portion 13. In the first deformation prevention portion 160, a plurality of through-hole portions 162 are provided in portions facing the right side face portion 22R and the left side face portion 22L such that the through-hole portions 162 extend through the first deformation prevention portion 160, more specifically, the through-hole portions 162 extend between the right side face portion 22R and the left side face portion 22L. Thus, by using the first deformation prevention portion 160, it is possible to reduce the weight without reducing the rigidity. The cap 150 includes lug portions that are fitted to the upper rail 20 by being engaged with the hole portions 22H (refer to FIG. 2) that are provided in the right side face portion 22R and the left side face portion 22L (refer to FIG. 5) at positions in the rear end portion 20B of the upper rail 20. The lug portions are provided between the base portion 152 and the first deformation prevention portion 160 in the cap 150, as shown in FIG. 11 and FIG. 12. The lug portions include paired first lug portions 156 provided on the side of the base portion 152, and paired second lug portions 158 provided on the side of the first deformation prevention portion 160. As shown in FIG. 10, in the slide rail 11, when the upper rail 20 is located at a rearmost position 11B in a slide allowable range in which the upper rail 20 is allowed to slide with respect to the lower rail 40, the rear end portion 20B of the upper rail 20 is located behind the rear end portion 40B of the lower rail 40. Therefore, the first deformation prevention portion 160 is located in the vicinity of the rear end portion 40B of the lower rail 40 when the upper rail 20 is located at the rearmost position 11B in the slide allowable range. More specifically, the first deformation prevention portion 160 is provided so as to overlap, in the longitudinal direction, with at least a portion of a fixation region 40X between a fixing member 40C and the rear end portion 40B of the lower rail 40 when the upper rail 20 is located at the rearmost position 11B in the slide allowable range. The fixing member 40C fixes the rear end portion 40B-side portion of the lower rail 40 to a vehicle structure member such as a floor surface of a vehicle. Further, the first deformation prevention portion 160 is provided so as to overlap, in the longitudinal direction, with at least a portion of a fitting region 30X where the seat body 1 is fitted to the upper face portion 21 of the upper rail 20 using the fastening member 30 including the bolts 30B and the nuts 30N. Thus, the cap 150 includes a connection portion 154 that integrally connects the base portion 152 and the first deformation prevention portion 160 such that the first deformation prevention portion 160, which is away from the base portion 152, is provided at a position that is set taking into account the fitting region 30X and the fixation region 40X. As shown in FIG. 11 and FIG. 12, the connection portion 154 is formed to be thinner than the base portion 152 and the first deformation prevention portion 160 to reduce the weight, and to allow the first lug portions 156 and the second lug portions 158 to be elastically deformed easily. The base portion 152 is provided with a second deformation prevention portion 170 that reduces or suppresses the deformation of the lower rail 40 or the rear end portion 20B of the upper rail 20 in the longitudinal direction. The second deformation prevention portion 170 includes wall portions 172 that respectively contact an inner surface of the upper face portion 21, and inner surfaces of the right side face portion 22R and the left side face portion 22L at a position in the rear end portion 20B of the upper rail 20.

Thus, the cap 150 includes the base portion 152 that is adjacent to the rear end portion 20B of the upper rail 20 in the longitudinal direction, thereby protecting the rail end portion. The first deformation prevention portion 160 is disposed in the space portion 13 surrounded by the lower face portion 41 of the lower rail 40, the upper face portion 21 of the upper rail 20, and the right side face portion 22R and the left side face portion 22L (the paired side face portions) of the upper rail 20, at the position between the right side face portion 22R and the left side face portion 22L. When a large load is applied to the slide rail 11 so that the seat body 1 falls down forward due to a vehicle collision or the like, and the lower rail 40 and the upper rail 20 are separated from each other from the rear end side due to the large load, the right side face portion 22R and the left side face portion 22L may be deformed to be closer to each other. Accordingly, the first deformation prevention portion 160 reduces or suppresses the deformation of the right side face portion 22R and the left side face portion 22L, thereby reducing or suppressing the rail deformation. Further, since the base portion 152 and the first deformation prevention portion 160 are provided as one unit, it is possible to reduce the number of components. Further, in the slide rail 11, when the upper rail 20 is located at the rearmost position 11B in the slide allowable range in which the upper rail 20 is allowed to slide with respect to the lower rail 40, the rear end portion 20B of the upper rail 20 is located behind the rear end portion 40B of the lower rail 40. At this time, if the lower rail 40 and the upper rail 20 are separated from each other from the rear end side due to the vehicle collision or the like, the deformation of the rear end portion 40B of the lower rail 40 is pronounced. Therefore, the first deformation prevention portion 160 is provided so as to be located in the vicinity of the rear end portion 40B of the lower rail 40 when the upper rail 20 is located at the rearmost position 11B in the slide allowable range. Thus, the first deformation prevention portion 160 is disposed at the position appropriate for reducing or suppressing the rail deformation.

Further, the first deformation prevention portion 160 is disposed so as to overlap with at least a portion of the fixation region 40X between the fixing member 40C and the rear end portion 40B of the lower rail 40 in the longitudinal direction when the upper rail 20 is located in the rearmost position 11B in the slide allowable range. The fixing member 40C fixes the rear end portion 40B-side of the lower rail 40 to the vehicle structure member such as the floor surface of the vehicle. Thus, the first deformation prevention portion 160 is disposed at the position more appropriate for reducing or suppressing the rail deformation.

The first deformation prevention portion 160 is disposed so as to overlap, in the longitudinal direction, with at least a portion of the fitting region 30X where the seat body 1 is fitted to the upper face portion 21 of the upper rail 20. When a large load is applied to the slide rail 11 so that the seat body 1 falls down forward due to the vehicle collision or the like, a transmission path, through which the load is transmitted, is located in the fitting region 30X where the seat body 1 is fitted to the upper face portion 21 of the upper rail 20. Therefore, by disposing the first deformation prevention portion 160 in the fitting region 30X from which deformation may start, it is possible to further reduce or suppress the rail deformation.

Further, the second deformation prevention portion 170 that reduces or suppresses the deformation of the lower rail 40 or the rear end portion 20B of the upper rail 20 in the longitudinal direction is provided in the base portion 152 of the cap 150. Thus, it is possible to further reduce or suppress the rail deformation.

The above-mentioned structure of the lower rail 40 and the upper rail 20 of the slide rail 11 is an example of the structure in the first embodiment, and various rail structures may be employed as long as the fitting portion 12 that prevents separation of the lower rail 40 and the upper rail 20 is provided. For example, the structure of the lower rail 40 and the upper rail 20 in the first embodiment may be reversed. While the case, in which the caps 100, 150, 200, 250 are made of synthetic resin, is described above, the invention is not limited to this case, and the caps 100, 150, 200, 250 may be made of metal. In the vehicle seat, the lift mechanism 60 is not necessarily required. That is, the seat body 1 may be connected to the upper rail 20 via brackets without using the lift mechanism 60.

As described above, in the vehicle seat according to the first embodiment, the operating member 90 is moved from the initial position 91A to the second operation position 91C such that the canceling operating force is applied against the urging force of the lock spring 80 (the lock member, the first urging member) and the urging force of the plate spring 95 (the second urging member). When the operating member 90 is located at the second operation position 91C, the slide lock state achieved by the lock spring 80 is canceled. The clearance 99 is set in the region from the initial position 91A to the second operation position 91C. Thus, even when an unexpected external load, such as a large load, is applied to the slide lock mechanism 70 and the slide rail 11, it is possible to suppress unintended canceling of the slide lock state (unintended unlocking of the slide locking). Further, the operating member 90 includes the plate spring 95 (the second urging member) that applies the urging force toward the initial position 91A at which the operating member 90 is located before the operation of the operating member 90 is started. Thus, the operating member 90 can be stably (reliably) maintained at the initial position 91A until the canceling operating force is applied (input) to the operating member 90.

The operating member 90 includes the three members, that is, the loop handle 91 (the input operating member) to which the canceling operating force is input, the lever member 92 (the output operating member) that outputs the canceling operating force, and the plate spring 95 (the second urging member). The clearance 99 is provided between the loop handle 91 and the lever member 92. The initial position 91A is set by maintaining the clearance 99 between the loop handle 91 and the lever member 92 using the urging force of the plate spring 95 (the second urging member). Thus, it is possible to provide the slide lock mechanism 70 that suppresses the unintended canceling of the slide lock state (the unintended unlocking of the slide lock) more reliably.

Further, the operator feels that the operating member 90 is continuously (smoothly) operated, without unnecessarily increasing the canceling operating force applied to the operating member 90.

The lock spring 80 is disposed in the space portion 13 of the slide rail 11. Thus, the compact-sized slide lock mechanism 70 is provided. Accordingly, the space around the seat body 1 can be effectively used. With the compact-sized slide lock mechanism 70, it is possible to suppress the unintended canceling of the slide lock state.

A vehicle seat according to a second embodiment of the invention will be described with reference to FIG. 19 to FIG. 25. In the second embodiment, an operating member 290 is provided instead of the operating member 90 in the first embodiment. The other portions of the configuration in the second embodiment are the same as the corresponding portions of the configuration in the first embodiment. Therefore, the same portions as those in the first embodiment will be denoted by the same reference numerals and symbols, and the detailed descriptions thereof will be omitted.

Figure 19:
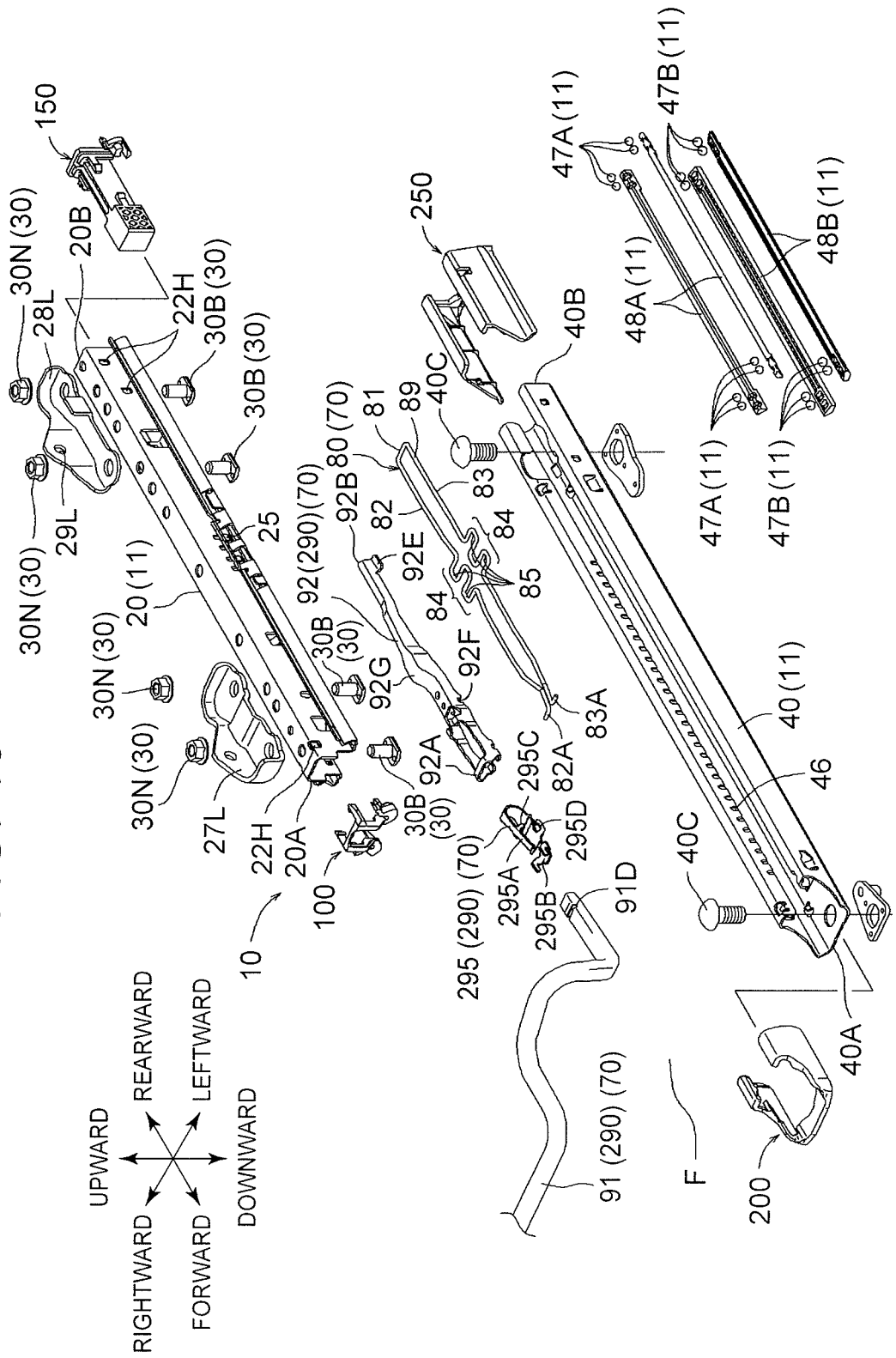
FIG. 19 is an exploded perspective view of a slide rail device in a vehicle seat according to a second embodiment of the invention.
Figure 20:
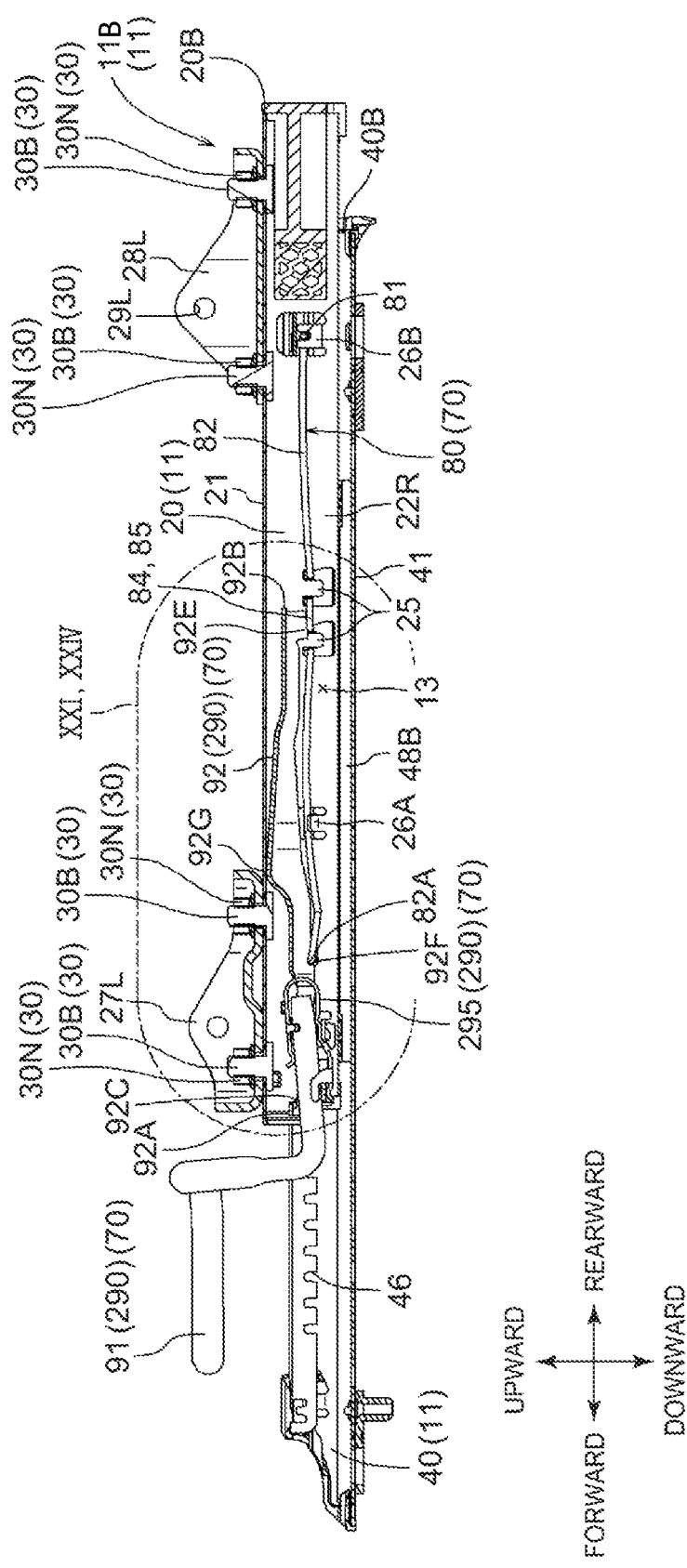
FIG. 20 is a sectional view in a longitudinal direction showing the slide rail device in the vehicle seat according to the second embodiment.

As shown in FIG. 19 and FIG. 20, the operating member 290 is a member that transmits the canceling operating force of an operator to the lock spring 80 so as to cancel the slide lock state in which the lock spring 80 provided as the lock member is engaged with the lock grooves 46 and the cut portions 25. The operating member 290 mainly includes the loop handle 91 (the input operating member), the lever member 92 (the output operating member), and a plate spring 295 (a second urging member). Each of the loop handle 91 (the input operating member) and the lever member 92 (the output operating member) has the same structure as in the first embodiment.

As shown in FIG. 19 to FIG. 23, the plate spring 295 is formed of a metal plate member, and has a substantially U sectional shape. The plate spring 295 is provided in the front end 92A-side of the lever member 92. The end portion of the loop handle 91 is inserted in an open end side of the plate spring 295. A protruding portion 295C is provided in one end 295A of the plate spring 295. The protruding portion 295C is engaged with the opening portion 91D provided in the upper portion of the loop handle 91 to maintain the loop handle 91 and to prevent the loop handle 91 from falling off. The one end 295A of the plate spring 295 includes a first support portion 295F that applies an urging force P1 in a downward direction to the upper portion of the outer peripheral surface of the loop handle 91.

The other end 295B of the plate spring 295 includes a stepped portion 295E having a distal end portion that is bent in a thickness direction, and thus, the stopper 92D is held between the other end 295B of the plate spring 295 and the lower portion of the outer periphery of the loop handle 91. Thus, the other end 295B of the plate spring 295 includes a second support portion 295G that applies an urging force P2 in an upward direction to the lever member 92 to support the lever member 92. The other end 295B of the plate spring 295 applies an urging force P4 in an upward direction to the lower portion of the outer peripheral surface of the loop handle 91 via the stopper 92D. An engagement piece 295L, which is formed by cutting and bending a portion of the other end 295B of the plate spring 295 toward the one end 295A, is provided behind the second support portion 295G. The engagement piece 295L has a shape bending forward. Thus, the engagement piece 295L extends toward a position above the stopper 92D, and is engaged with the stopper 92D, whereby the plate spring 295 is maintained and prevented from falling forward from the lever member 92. The other end 295B of the plate spring 295 includes engagement portions 295D (a first engagement portion) formed by cutting and bending portions of the other end 295B in a direction away from the one end 295A. The engagement portions 295D are engaged with the cut-bent pieces 22R1, 22L1 that are formed by cutting and bending portions of the right side face portion 22R and the left side face portion 22L of the upper rail 20 (the cut-bent piece 22L1 is provided on the left side face portion 22L-side, but is not shown in the drawings). Thus, the plate spring 295 and the lever member 92 are maintained such that the plate spring 295 and the lever member 92 are not moved rearward. Distal ends of the engagement portions 295D respectively include arc portions 295J having an arc shape, and the arc portions 295J are in contact with the cut-bent pieces 22R1, 22L1. Bent portions 295K that are bent in the thickness direction are provided in portions of a plate face of the other end 295B of the plate spring 295, the portions respectively facing the arc portions 295J. The bent portions 295K are in contact with the cut-bent pieces 22R1, 22L1. Thus, each of the cut-bent pieces 22R1, 22L1 is held between the corresponding engagement portion 295D and the corresponding bent portion 295K in the plate spring 295, and the plate spring 295 is engaged with the cut-bent pieces 22R1 and 22L1 such that the plate spring 295 is rotatable about the arc portions 295J and the bent portions 295K. The bent portions 295K apply an urging force P5 in a downward direction to the cut-bent pieces 22R1, 22L1. The engagement portions 295D apply an urging force P6 in an upward direction to the cut-bent pieces 22R1, 22L1.

The plate spring 295 includes a third support portion 295H provided behind the bent portions 295K. The third support portion 295H applies an urging force P3 in an upward direction to the lower portion of the outer peripheral surface of the loop handle 91, thereby supporting the lower portion of the outer peripheral surface of the loop handle 91. Thus, the engagement portions 295D (the first engagement portion) are provided between the third support portion 295H and the second support portion 295G. The urging force P1 of the first support portion 295F is applied in the direction facing the direction in which the urging force P2 of the second support portion 295G and the urging force P3 of the third support portion 295H are applied. In each of FIGS. 22, 23, 25, each black arrow (solid arrow) indicates the force that is applied by the plate spring 295 to the loop handle 91, and each outlined arrow indicates the force that is applied by the plate spring 295 to the upper rail 20 or the lever member 92.

The urging force of the lock spring 80 is set to be larger than the urging force (i.e., the urging forces P1 to P6) of the plate spring 295. In the front end 92A of the lever member 92, the stopper 92C and the stopper 92D are provided. The upper portion of the outer peripheral surface of the loop handle 91 contacts the stopper 92C, and the lower portion of the outer peripheral surface of the loop handle 91 contacts the stopper 92D. Thus, since the plate spring 295 is provided between the loop handle 91 and the lever member 92, the loop handle 91 is fitted (connected) to the lever member 92 so as to be rotatable (movable) in the vehicle up-down direction relative to the lever member 92 between an initial position 291A at which the loop handle 91 contacts the stopper 92D due to the urging force of the plate spring 295, and a first operation position 291B at which the loop handle 91 contacts the stopper 92C due to the operating force of the operator that acts against the urging force of the plate spring 295. The loop handle 91 is normally located at the initial position 291A shown in FIG. 21 and FIG. 22 due to the urging force of the plate spring 295. The clearance 99 (for play) that allows the loop handle 91 to rotate (move) relative to the lever member 92 is provided between the upper portion of the outer peripheral surface of the loop handle 91 at the initial position 291A and the stopper 92C of the lever member 92. When the operating force is applied to the loop handle 91 to move the loop handle 91 upward, the loop handle 91 is moved in the clockwise direction in FIG. 21 and FIG. 22 (the loop handle 91 is rotated in the clearance 99) against the urging force of the plate spring 295 until the loop handle 91 contacts the stopper 92C. When the loop handle 91 is further operated from the first operation position 291B at which the loop handle 91 contacts the stopper 92C of the lever member 92 as shown in FIG. 21 and FIG. 22, the loop handle 91 moves the front end 92A-side of the lever member 92 upward.

Figure 21:
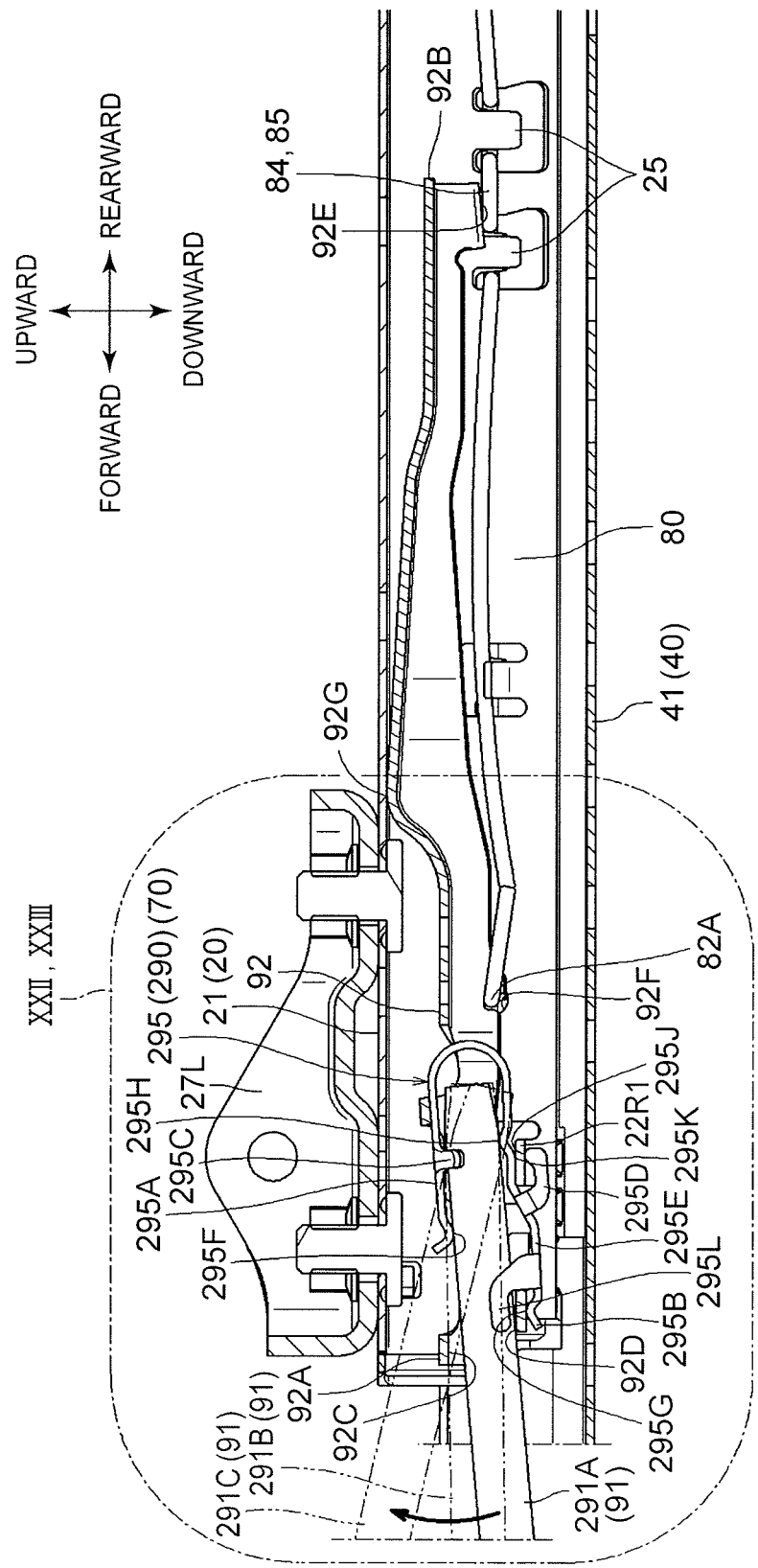
FIG. 21 is a partial sectional view of a portion XXI in FIG. 20.
Figure 22:
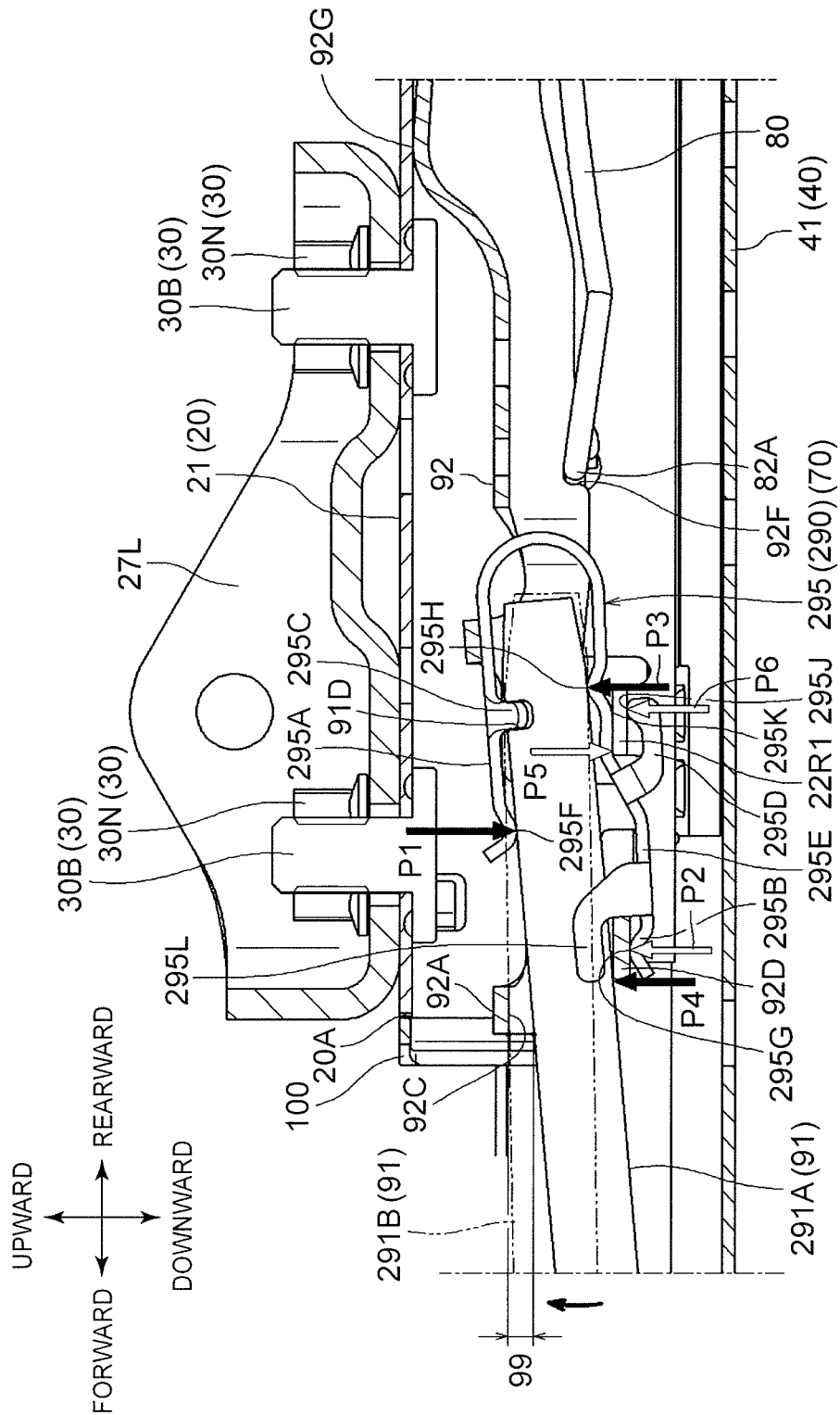
FIG. 22 is a partial sectional view of a portion XXII in FIG. 21.
Figure 23:
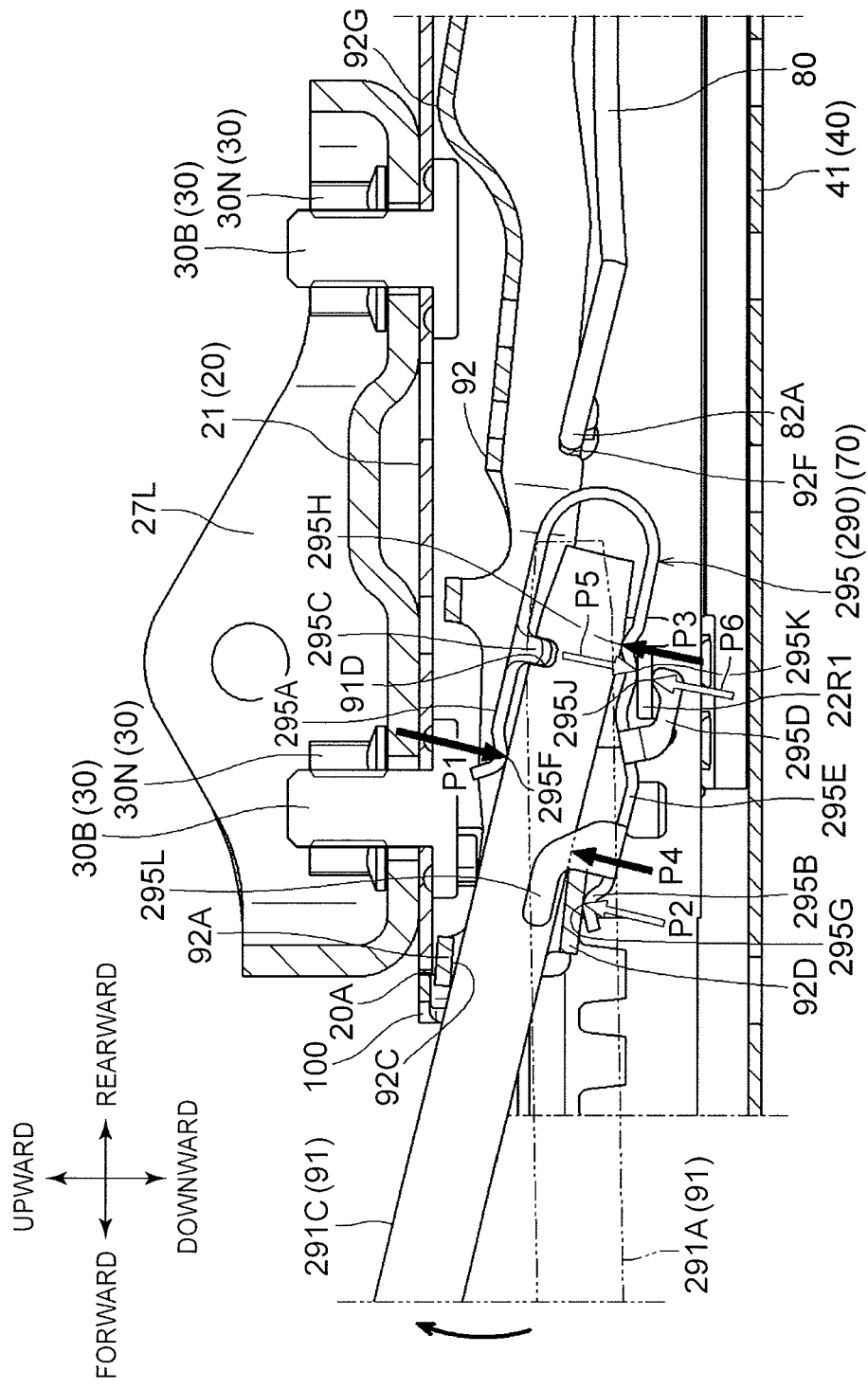
FIG. 23 is a partial sectional view of a portion XXIII in FIG. 21.
Figure 24:
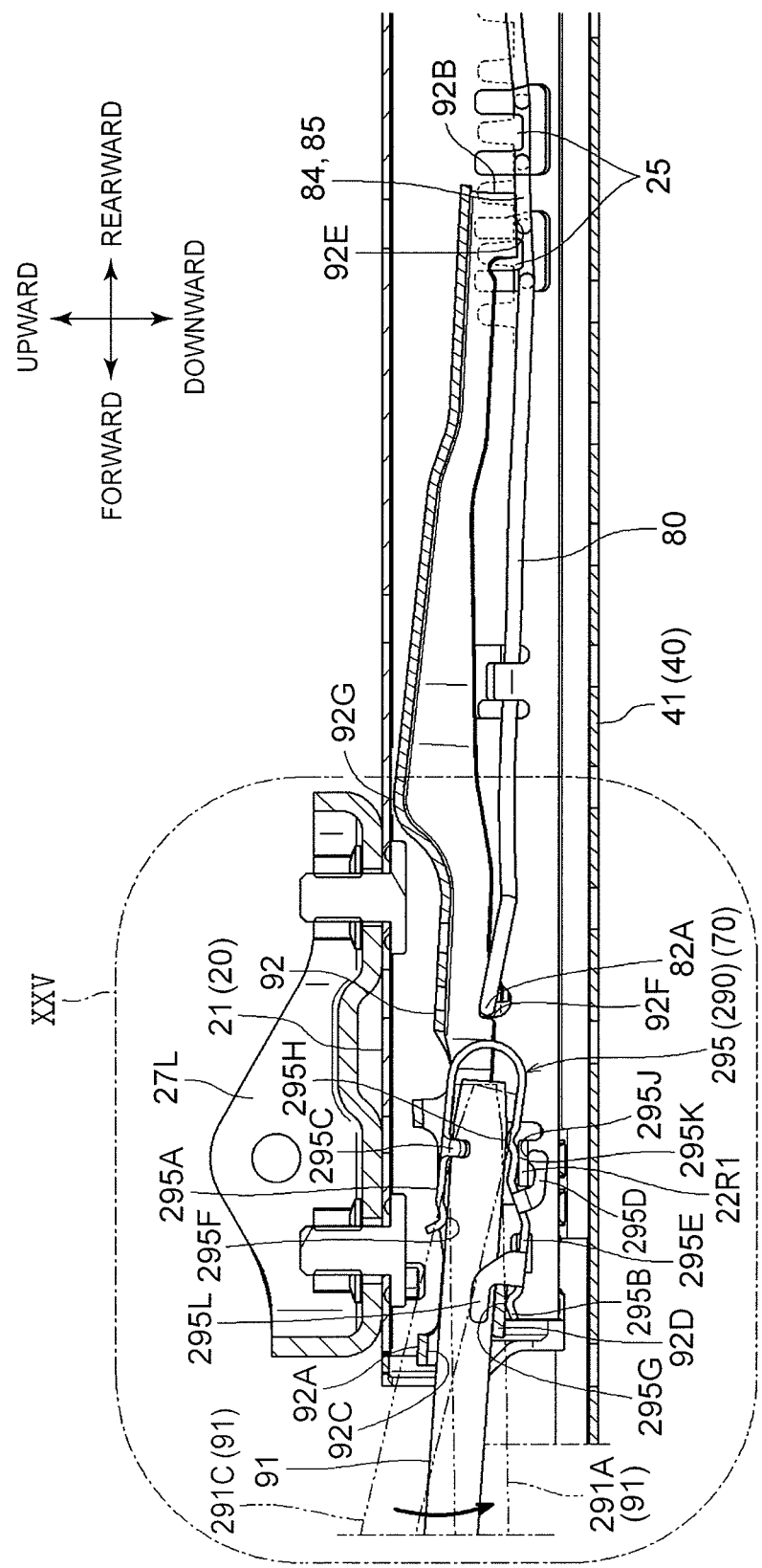
FIG. 24 is a partial sectional view of a portion XXIV in FIG. 20.

In this state, the lever member 92 rotates in the clockwise direction in FIG. 21 about the support point 92G, and the lever member 92 reaches a second operation position 291C at which the pressing portions 92E (refer to FIG. 3) move downward against the urging force of the lock spring 80. As shown in FIG. 21 and FIG. 24, when the lever member 92 is located at the second operation position 291C (in other words, when the loop handle 91 is located at the second operation position 291C), the pressing portions 92E (refer to FIG. 3) press and elastically deform the elastic deformation portions 84 of the lock spring 80 such that the engagement grooves 85 are disengaged from the lock grooves 46 and the cut portions 25 (refer to FIG. 2 and FIG. 3).

Various configurations for fitting the plate spring 295 may be employed. If a configuration in which portions of the other end 295B of the plate spring 295 are inserted in the cut-bent pieces 22R1, 22L1 (in other words, the plate spring 295 is not able to be rotated with respect to the cut-bent pieces 22R1, 22L1) is employed, the urging force of the plate spring 295 is unnecessarily applied when the loop handle 91 is moved from the first operation position 291B to the second operation position 291C. Therefore, the canceling operating force that needs to be applied to the loop handle 91 is increased by an amount corresponding to the urging force of the plate spring 295 (in other words, an additional canceling operating force corresponding to the urging force of the plate spring 295 needs to be applied to the loop handle 91). Accordingly, the operator is unlikely to feel that the loop handle 91 is continuously (smoothly) operated to apply the canceling operating force.

However, since the plate spring 295 is rotated relative to the upper rail 20 about the arc portions 295J and the bent portions 295K, it is possible to reduce the influence of the urging force of the plate spring 295 on the operating member 290. Accordingly, the operator feels that the operating member 290 is continuously (smoothly) operated, without unnecessarily increasing the canceling operating force.

Thus, while the loop handle 91 is moved from the initial position 291A to the first operation position 291B, the urging force of the plate spring 295 (the second urging member) is applied, and while the loop handle 91 is moved from the first operation position 291B to the second operation position 291C, the influence of the urging force of the plate spring 295 is reduced and the urging force of the lock spring 80 (the first urging member) is applied. Thus, the operator feels that the loop handle 91 is continuously (smoothly) operated to apply the canceling operating force for canceling the slide lock state. In other words, when the loop handle 91 is moved from the initial position 291A to the first operation position 291B, the lock canceling force (the canceling operating force) is transmitted to the lever member 92 via the plate spring 295 (the second urging member) (against the urging force of the plate spring 295). When the loop handle 91 is moved from the first operation position 291B to the second operation position 291C, the lock canceling force is transmitted to the lever member 92 against the urging force of the lock spring 80 in a state in which the influence of the urging force of the plate spring 295 is reduced. Thus, the operator feels that the loop handle 91 is continuously (smoothly) operated to apply the lock canceling force (the operator feels that the lock canceling force is continuously (smoothly) applied).

As described above, the plate spring 295 is rotated relative to the upper rail 20 about the arc portions 295J and the bent portions 295K. Therefore, the influence of the urging force of the plate spring 295 on the operating member 290 is reduced, and the canceling operating force is not unnecessarily increased. However, in any region in the region from the initial position 291A of the operating member 290 to the second operation position 291C of the operating member 290 including the first operation position 291B, the urging force P1 of the first support portion 295F of the plate spring 295, the urging force P2 of the second support portion 295G of the plate spring 295, and the urging force P3 of the third support portion 295H of the plate spring 295 are applied. In addition, in any region in the region from the initial position 291A of the operating member 290 to the second operation position 291C of the operating member 290 including the first operation position 291B, the engagement portions 295D are maintained in the engaged state such that the plate spring 295 is rotatable relative to the upper rail 20 about the arc portions 295J and the bent portions 295K. Therefore, in any region in the region from the initial position 291A of the operating member 290 to the second operation position 291C of the operating member 290 including the first operation position 291B, the urging force P5 of the bent portions 295K and the urging force P6 of the engagement portion 295D are applied. This makes it possible to reduce or suppress the backlash of the operating member 290, particularly when the operating member 290 is returned from the second operation position 291C to the initial position 291A.

Figure 25:
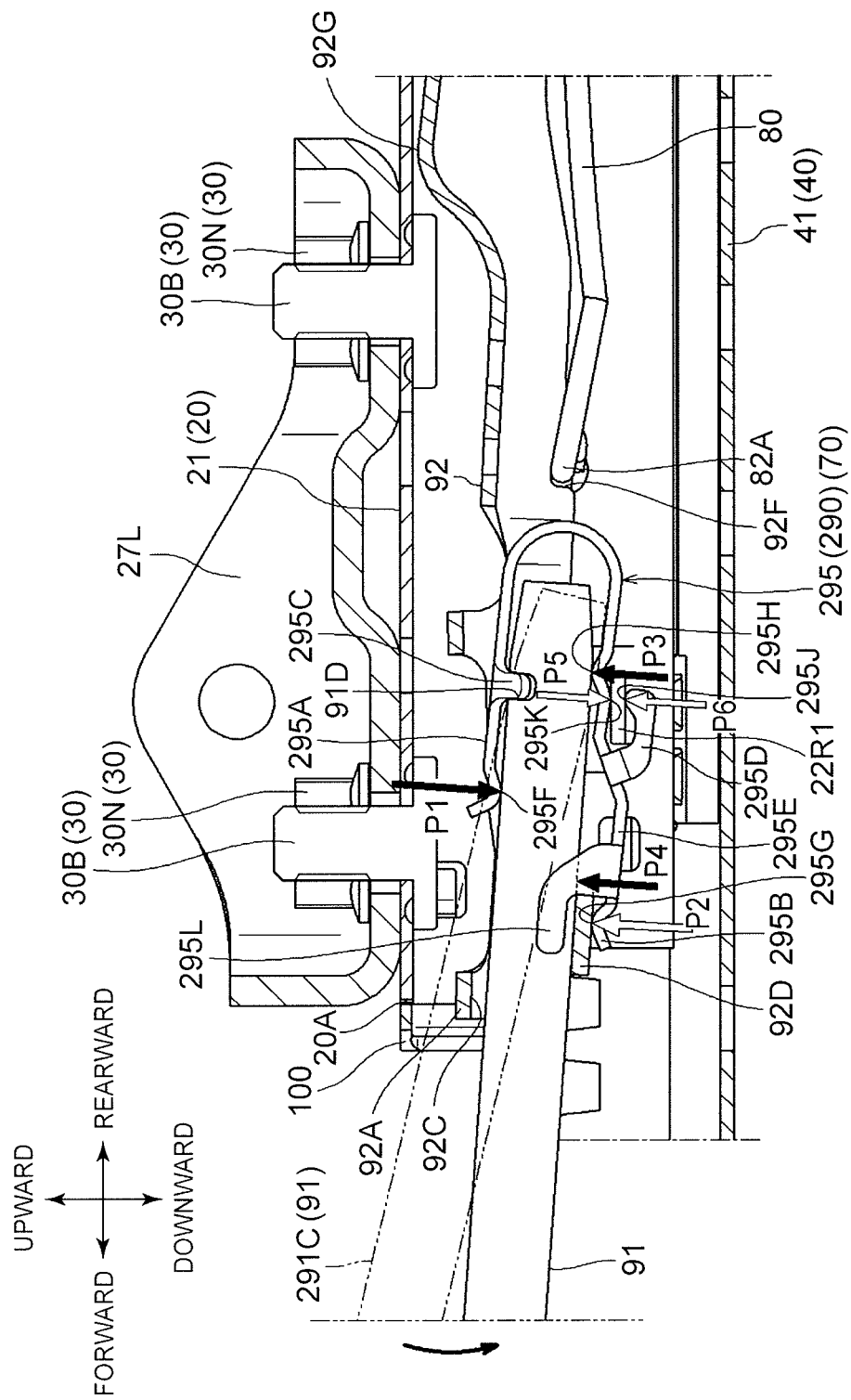
FIG. 25 is a partial sectional view of a portion XXV in FIG. 24.

As shown in FIG. 24 and FIG. 25, after the slide lock state achieved by the slide lock mechanism 70 is canceled by operating the operating member 290 and the seat body 1 is slid, the operating member 290 is returned to the initial position 291A. If the engagement grooves 85 of the lock spring 80 move onto, and are located on distal ends defining the lock grooves 46, the urging force of the lock spring 80 is not applied to the lever member 92. As described above, the urging force P1 of the first support portion 295F, the urging force P2 of the second support portion 295G, and the urging force P3 of the third support portion 295H are applied such that the urging force P1 and the urging forces P2, P3 are applied in the directions facing each other. In any region in the region from the initial position 291A of the operating member 290 to the second operation position 291C of the operating member 290 including the first operation position 291B, the urging force P5 of the bent portions 295K and the urging force P6 of the engagement portions 295D are applied. Accordingly, the urging force (urging forces P1 to P6) of the plate spring 295 is applied in any region in the region from the initial position 291A of the operating member 290 to the second operation position 291C of the operating member 290 including the first operation position 291B. Therefore, even when the engagement grooves 85 of the lock spring 80 are located on the distal ends defining the lock grooves 46, the plate spring 295 reduces or suppresses the backlash of the lever member 92 and the loop handle 91. When the operating member 290 is returned to the initial position 291A, the lower portion of the outer peripheral surface of the loop handle 91 contacts the stopper 92D, and the urging force P4 is applied. Therefore, the backlash of the lever member 92 and the loop handle 91 is more unlikely to occur (the backlash of the lever member 92 and the loop handle 91 is further reduced or suppressed).

As described above, in the vehicle seat according to the second embodiment, the operating member 290 is moved from the initial position 291A to the second operation position 291C such that the canceling operating force is applied against the urging force of the lock spring 80 (the first urging member) and the urging force of the plate spring 295 (the second urging member). When the operating member 290 is located at the second operation position 291C, the slide lock state achieved by the lock spring 80 is canceled. The clearance 99 is set in the region from the initial position 291A to the second operation position 291C. Thus, even when an unexpected external load, such as a large load, is applied to the slide lock mechanism 70 and the slide rail 11, it is possible to suppress unintended canceling of the slide lock state (unintended unlocking of the slide locking). Further, the operating member 290 includes the plate spring 295 that applies the urging force toward the initial position 291A at which the operating member 290 is located before the operation of the operating member 290 is started. Thus, the operating member 290 can be stably (reliably) maintained at the initial position 291A until the canceling operating force is applied (input) to the operating member 290.

The operating member 290 includes the three members, that is, the loop handle 91 (the input operating member) to which the canceling operating force is input, the lever member 92 (the output operating member) that outputs the canceling operating force, and the plate spring 295 (the second urging member). The clearance 99 is provided between the loop handle 91 and the lever member 92. The initial position 291A is set by maintaining the clearance 99 between the loop handle 91 and the lever member 92 using the urging force of the plate spring 295. Thus, it is possible to provide the slide lock mechanism 70 that suppresses the unintended canceling of the slide lock state (the unintended unlocking of the slide lock) more reliably.

The plate spring 295 includes the first support portion 295F that applies the urging force to the loop handle 91 to support the loop handle 91, the second support portion 295G that applies the urging force to the lever member 92 to support the lever member 92, and the engagement portions 295D (the first engagement portion) that are engaged with the upper rail 20. Thus, when the loop handle 91 and the lever member 92 are moved relative to each other, the plate spring 295 stably (reliably) maintains the loop handle 91 and the lever member 92 in the connected state.

Since the engagement portions 295D are rotatable relative to the upper rail 20, the plate spring 295 is rotatable relative to the upper rail 20. Thus, it is possible to reduce the influence of the urging force of the plate spring 295 on the operating member 290, and the operator feels that the operating member 290 is continuously (smoothly) operated, without unnecessarily increasing the canceling operating force.

Further, it is possible to stably (reliably) maintain the loop handle 91 and the lever member 92 in the connected state when the loop handle 91 and the lever member 92 are moved relative to each other, and at the same time, it is possible to reduce the influence of the urging force of the plate spring 295 on the operating member 290 such that the operator feels that the operating member 290 is continuously (smoothly) operated, without unnecessarily increasing the canceling operating force.

Further, it is possible to further reduce or suppress the backlash of the loop handle 91 and the lever member 92 in the operating member 290.

As in the first embodiment, the lock spring 80 is disposed in the space portion 13 of the slide rail 11. Thus, the compact-sized slide lock mechanism 70 is provided. Accordingly, the space around the seat body 1 can be effectively used. Further, with the compact-sized slide lock mechanism 70, it is possible to suppress the unintended canceling of the slide lock state (the unintended unlocking of the slide locking).

While the embodiments of the invention are described above, the vehicle seat according to the invention is not limited to the embodiments, and may be realized in other various embodiments. For example, in the above-mentioned embodiment, the cut-bent piece, which is formed by cutting and bending a portion of the plate face of the upper rail, is employed. However, the piece employed in the invention is not limited to the cut-bent piece. A piece, which is formed separately from the upper rail, may be employed. The engagement portion may be provided at various positions in the plate spring, as long as the plate spring is able to be rotatable relative to the upper rail. As the posture of the cut-bent piece relative to the upper rail, various postures may be employed.

In the above-mentioned configuration, both of the lock member and the operating member are provided inside the slide rail. However, the invention is not limited to this configuration. For example, the lock member and/or the operating member may be provided outside the slide rail. In the above-mentioned configuration, the lock spring functions as both of the lock member and the first urging member. However, the invention is not limited to this configuration. For example, in the slide lock mechanism, the lock member and the first urging member may be separate members.

The term vehicle may refer to any machine or conveyance that carries people or thins from one place to another such as an automobile, a truck, a bus, a train, an aircraft, a boat, a vessel, and a submarine. However, it is noted that these examples are merely provided for purposes of enhancing understanding the present disclosure, and thus should not be construed as limiting.

What is claimed is:
1. A vehicle seat comprising:
a slide rail that includes a lower rail arrangeable on a side of a vehicle structure member, and an upper rail dis- posed on a side of a seat body, the upper rail being slidable with respect to the lower rail; and a slide lock mechanism that restrains slide movement of the upper rail with respect to the lower rail at a predetermined position, wherein the slide lock mechanism includes a lock member operable to restrain the slide movement of the upper rail with respect to the lower rail at the predetermined position to achieve a slide lock state, and an operating member operable to transmit, to the lock member, a canceling operating force for canceling the slide lock state achieved by the lock member, the lock member elastically applies an urging force to maintain the slide lock state achieved by the lock member, the operating member includes an input operating member, and an urging member that applies an urging force to the input operating member toward an initial position, the urging force of the lock member is larger than the urging force of the urging member, the input operating member is configured to move from the initial position to a first operation position, and to move from the first operation position to a second operation position during which the canceling operating force is applied against the urging force of the lock member and the urging force of the urging member, when the input operating member is located at the second operation position, the slide lock state achieved by the lock member is canceled, the operating member includes the input operating member to which the canceling operating force is input, and an output operating member that outputs the canceling operating force, the urging member is provided between the input operating member and the output operating member such that the input operating member and the output operating member are movable relative to each other, a clearance is provided between the input operating member and the output operating member when the input operating member is at the initial position, no clearance is provided between the input operating member and the output operating member when the input operating member is at the first operation position, and as the input operating member is moved from the initial position to the first operation position, an amount of the clearance decreases, the initial position is set by maintaining the clearance between the input operating member and the output operating member using the urging force of the urging member, the urging member includes a first support portion that applies an urging force to the input operating member to support the input operating member, a second support portion that applies an urging force to the output operating member to support the output operating member, and a first engagement portion that is engaged with and directly contacts a surface of the upper rail, the first engagement portion is engaged with and directly contacts the surface of the upper rail such that the first engagement portion is rotatable relative to the surface of the upper rail, and the urging member further includes a bent portion, and the urging member is engaged with the upper rail between the first engagement portion and the bent portion.

2. The vehicle seat according to claim 1, wherein the urging force of the first support portion and the urging force of the second support portion are applied while the input operating member is positioned from the initial position to the second operation position; and the first engagement portion is maintained in an engaged state while the input operating member is positioned from the initial position to the second operation position.

3. The vehicle seat according to claim 1, wherein the urging force of the first support portion is applied in a direction facing a direction in which the urging force of the second support portion is applied.

4. The vehicle seat according to claim 1, wherein the lock member is disposed in a space portion defined by a lower face portion of the lower rail, an upper face portion of the upper rail, and paired side face portions of one of the lower rail and the upper rail, the lower face portion arrangeable to face the vehicle structure member, and the upper face portion facing the seat body, and the operating member is inserted through end portions of the lower rail and the upper rail in a longitudinal direction, and is engaged with the lock member.

5. The vehicle seat according to claim 1, wherein the surface of the upper rail is arrangeable to face the side of the vehicle structure member.

* * * * *